US006888355B2

(12) United States Patent
Kitazawa et al.

(10) Patent No.: US 6,888,355 B2
(45) Date of Patent: May 3, 2005

(54) ELECTRONIC APPARATUS HAVING BATTERY POWER SOURCE AND CONTROL METHOD FOR THE ELECTRONIC APPARATUS

(75) Inventors: Koji Kitazawa, Shiojiri (JP); Hajime Kurihara, Shimosuwa-machi (JP); Motomu Hayakawa, Shiojiri (JP); Tsukasa Kosuda, Matsumoto (JP); Katsuyuki Honda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 13 days.

(21) Appl. No.: 10/343,503

(22) PCT Filed: Aug. 2, 2001

(86) PCT No.: PCT/JP01/06665

§ 371 (c)(1), (2), (4) Date: Feb. 3, 2003

(87) PCT Pub. No.: WO02/12973

PCT Pub. Date: Feb. 14, 2002

(65) Prior Publication Data

US 2003/0146755 A1 Aug. 7, 2003

(30) Foreign Application Priority Data

| | | |
|---|---|---|
| Aug. 2, 2000 | (JP) | 2000-234767 |
| Aug. 3, 2000 | (JP) | 2000-236107 |
| Aug. 11, 2000 | (JP) | 2000-245042 |
| Feb. 19, 2001 | (JP) | 2001-042572 |

(51) Int. Cl.[7] .................................... G01N 27/02

(52) U.S. Cl. ........................ 324/444; 324/426; 324/429

(58) Field of Search ............................ 307/64, 66, 116, 307/125, 130; 320/108, 128, 164; 324/430, 433, 426, 429, 444

(56) References Cited

U.S. PATENT DOCUMENTS

| | | | | |
|---|---|---|---|---|
| 5,773,960 A | | 6/1998 | Ueda | 320/127 |
| 5,959,432 A | | 9/1999 | Saurer et al. | 320/101 |
| 5,969,529 A | | 10/1999 | Eiraku et al. | 324/433 |
| 6,339,264 B1 | * | 1/2002 | Wang | 307/132 E |
| 6,507,195 B1 | * | 1/2003 | Nonaka | 324/430 |
| 6,664,795 B2 | * | 12/2003 | Tamagawa et al. | 324/548 |

FOREIGN PATENT DOCUMENTS

| | | |
|---|---|---|
| EP | 0 911 938 | 4/1999 |
| EP | 0 977 297 | 2/2000 |
| FR | 2 746 556 | 9/1997 |
| JP | 8-7930 | 1/1996 |
| JP | 8-331767 | 12/1996 |
| JP | 10-90378 | 4/1998 |
| JP | 11-259190 | 9/1999 |
| JP | 11-338585 | 12/1999 |

* cited by examiner

*Primary Examiner*—N. Le
*Assistant Examiner*—Walter Benson
(74) *Attorney, Agent, or Firm*—Michael T. Garik

(57) ABSTRACT

A voltage and internal resistance of a battery are measured in advance as its capacity decreases. In a flash memory of a device powered by the battery, voltages necessary to drive a motor, an EL display, and a bezel input unit are stored. By comparing the voltage of the battery with a resistor connected as a dummy load and the voltage read from the flash memory, it can be determined whether it is possible to drive the motor, the EL display, or the bezel input unit.

33 Claims, 15 Drawing Sheets

FIG. 5

| ADRESS IN FLASH MEMORY | | DATA IN FLASH MEMORY |
|---|---|---|
| HIGHER ORDER BIT | LOWER ORDER BIT | |
| BIT 18 ~ 16 | BIT 15 ~ 0 | BIT 15 ~ 0 |
| 000b | 1111111111111111b ↓ 0000000000000000b | DATA TO DRIVE BEZEL INPUT UNIT |
| 001b | 1111111111111111b ↓ 0000000000000000b | DATA TO DRIVE EL DIAPLAY |
| 010b | 1111111111111111b ↓ 0000000000000000b | DATA TO DRIVE MOTOR |
| 011b | 1111111111111111b ↓ 0000000000000000b | DATA TO DRIVE BEZEL INPUT UNIT AND EL DISPLAY |
| 100b | 1111111111111111b ↓ 0000000000000000b | DATA TO DRIVE BEZEL INPUT UNIT AND MOTOR |
| 101b | 1111111111111111b ↓ 0000000000000000b | DATA TO DRIVE EL DISPLAY AND MOTOR |
| 110b | 1111111111111111b ↓ 0000000000000000b | DATA TO DRIVE BEZEL INPUT UNIT, EL DISPLAY, AND MOTOR |

FIG. 6

| ADRESS IN FLASH MEMORY | DATA IN FLASH MEMORY |
|---|---|
| ADDRESS (BATTERY VOLTAGE) | DATA (BATTERY VOLTAGE) |
| 65535 ( 5V) | 757 (3.634V) |
| 65534 (4.998V) | 757 (3.634V) |
| 65533 (4.995V) | 757 (3.634V) |
| 65532 (4.993V) | 756 (3.629V) |
| 65531 ( 4.99V) | 756 (3.629V) |
| 65530 (4.988V) | 756 (3.629V) |
| 65529 (4.985V) | 755 (3.624V) |
| 65528 (4.983V) | 755 (3.624V) |
| 65527 ( 4.98V) | 755 (3.624V) |
| ⋮ ⋮ | ⋮ ⋮ |

ELECTRONIC APPARATUS HAVING BATTERY POWER SOURCE AND CONTROL METHOD FOR THE ELECTRONIC APPARATUS

TECHNICAL FIELD

The present invention relates to a battery-driven electronic apparatus having one or more devices requiring a large amount of battery power. There is also provided a control method for such an electronic apparatus.

BACKGROUND ART

With the recent proliferation of portable electronic apparatuses such as mobile phones and electronic organizers, a need has arisen for recharging and data transfer stations (hereinafter referred to simply as 'station(s)'). Such stations are commercially available and are designed to enable electronic apparatus users to both recharge devices and carry out data transfer. There are differing designs and methods of operation for such stations. In the conventional art, either electrical contacts or a coil are employed. Use of electrical contacts enables the structure of the apparatus to be kept relatively simple, but prevents the apparatus from being able to be sealed, whereby the water resistance of the apparatus cannot be obtained.

A station for recharging and data transfer which is equipped with a coil can be used for the above purpose with an electronic apparatus which is also equipped with a coil. When data transfer or recharging a battery is to be carried out between the station and the electronic apparatus, a high frequency signal is fed to a coil of one side, thereby inducing a magnetic field around the coil. This magnetic field induces an electric current in a coil of the other side. By rectifying the induced current and then feeding it to a battery, the battery is recharged. Also, extracting signals from the induced current enables transfer of data.

When a portable electronic apparatus, using a rechargeable (or a primary) battery as a power supply, has high load devices which consumes large power of the battery, battery voltage may be lowered significantly when the high load device is driven.

Such high load devices include, for example, a vibrator motor that is used for notification, an electroluminescence (EL) display for displaying information, and a flash memory which consumes large amount of power when writing and erasing data.

These high load devices significantly lower battery voltage when the devices are driven. Therefore, the battery must have enough charge and the internal resistance of the battery has to be low in order to correctly drive these high load devices.

Furthermore, when a high load device is driven and the battery voltage is lowered below the system requirement, the system fails, and requires resetting.

In order to solve the above drawbacks, a Japanese patent application laid-open No. H11-259190 discloses a control method for a portable terminal with a high load device. In this method, battery voltages without a load and with a certain load are measured, and then the internal resistance of the battery is calculated. Then using the calculated internal resistance and a load characteristic of the high load device, a predicted battery voltage is calculated for a case when the high load device is driven. Then a judgement is made whether the battery voltage would be lowered below a lowest voltage for driving the portable electric device when the high load device is driven. When driving the high load device would not lower the battery voltage below the lowest voltage for driving the portable electronic appliance, the high load device can be driven.

Below, the calculation method disclosed in the Japanese patent application laid-open No. H11-259190 is explained.

When a voltage of a battery under no load is V0 (Volt) and the battery voltage with a certain resistor R (Ω) being connected as a dummy load is V1 (volt), an internal resistance r (Ω) of the rechargeable battery can be obtained from the following equation, $$r=R\cdot(V0-V1)/V1.$$

Also, when a predicted value of the battery voltage with an actual high load device being connected is V3 (volt) and the necessary power for driving the high load device is P (watt), the following equation is obtained, $$V3=[V0+\sqrt{(V0^2-4rP)}]/2$$

When this predicted value of the battery voltage V3 satisfies the following inequality, the high load device can be driven.

$$V3\geqq V4$$

Where V4 is a lowest operational voltage for driving the portable terminal.

A drawback of this prior art method, however, is the need to complete a complicated calculation before actually driving a high load device. Completion of such a calculation is time-consuming, making it difficult to apply the method, to, for example, an EL display. Namely, when controlling an EL display, rapid judgement must be made to determine whether using the EL display is possible.

Also, in order to obtain a calculation result rapidly, an calculation circuit is subject to a high load, whereby power consumption is increased.

Also, the above conventional method does not allow a high load device to be connected directly to a battery that is a preceding step of constant voltage circuit.

Also, even when a device can work below the rated output voltage of the constant voltage circuit, if the output voltage of the constant voltage circuit declines below the rated output voltage, the system fails first, and the device can not be driven.

DISCLOSURE OF INVENTION

An object of the present invention is to provide an electronic apparatus and to provide a control method for it that can drive a high load device without a complicated calculation and with a quick determination whether the device can be driven, and that does not allow the system to fail when voltage of a rechargeable battery or a primary battery is lowered because the high load device is driven.

Another object of the present invention is to provide an electronic apparatus comprising:

a power supply that supplies power;

a driven unit that is driven by the power from the power supply;

a dummy load that discharges the power supply;

a switch that connects or disconnects the dummy load to or from the power supply;

a storage unit that associates and stores both a voltage of the power supply on which no load is imposed and a voltage of the power supply with its internal resistance being a highest allowable value and the dummy load being connected, the highest allowable value of the internal resistance being the highest internal resistance of the power supply that can drive the driven unit when no load is connected;

a voltage measurement unit that measures voltage of the power supply;

a comparison unit that compares a first voltage and a second voltage, the first voltage, measured by the voltage measurement unit, being a voltage of the power supply with the dummy load being connected, and the second voltage being the voltage of the power supply with its internal resistance being the highest allowable value and the dummy load being connected and the second voltage being read from the storage unit according to a voltage, measured by the voltage measurement unit, of the power supply with no load being connected; and a determination unit that determines whether the driven unit can be driven based on the comparison result, and, when it is possible to drive the driven unit, drives the driven unit.

Yet another object of the present invention is to provide a control method of an electronic apparatus:

the electronic apparatus comprising;

a power supply that supplies power;

a driven unit that is driven by the power from the power supply;

a dummy load that discharges the power supply;

a switch that connects or disconnects the dummy load to or from the power supply;

a storage unit that associates and stores both a voltage of the power supply on which no load is imposed and a voltage of the power supply with its internal resistance being a highest allowable value and the dummy load being connected, the highest allowable value of the internal resistance being the highest internal resistance of the power supply that can drive the driven unit when no load is connected; and a voltage measurement unit that measures voltage of the power supply;

the control method comprising;

comparing a first voltage and a second voltage, the first voltage, measured by the voltage measurement unit, being a voltage of the power supply with the dummy load being connected, and the second voltage being the voltage of the power supply with its internal resistance being the highest allowable value and the dummy load being connected and the second voltage being read from the storage unit according to a voltage, measured by the voltage measurement unit, of the power supply with no load being connected;

determining whether the driven unit can be driven based on the comparison result; and driving the driven unit when it is determined that driving the driven unit is possible.

Further object of the present invention is to provide an electronic apparatus comprising:

a power supply for supplying a first power;

a communication unit for receiving power from an external power supply and supplying the power as a second power;

a driven unit that is driven by the first or the second power;

a judging unit that judges that, when the first power is not sufficient to drive the driven unit, judges if power is supplied from the external power supply; and a drive prohibit unit that, when the first power is not sufficient to drive the driven unit and when the external power supply does not supply enough power to drive the driven unit, prohibits the driven unit from being driven.

BRIEF DESCRIPTION OF THE DRAWINGS

FIG. 5 is a diagram illustrating data structure in a flash memory.

FIG. 6 is a diagram illustrating a concrete example of data in the flash memory.

BEST MODE OF CARRYING OUT THE INVENTION

[1] First Embodiment

[1.1] Mechanical Configuration

Figure 1:
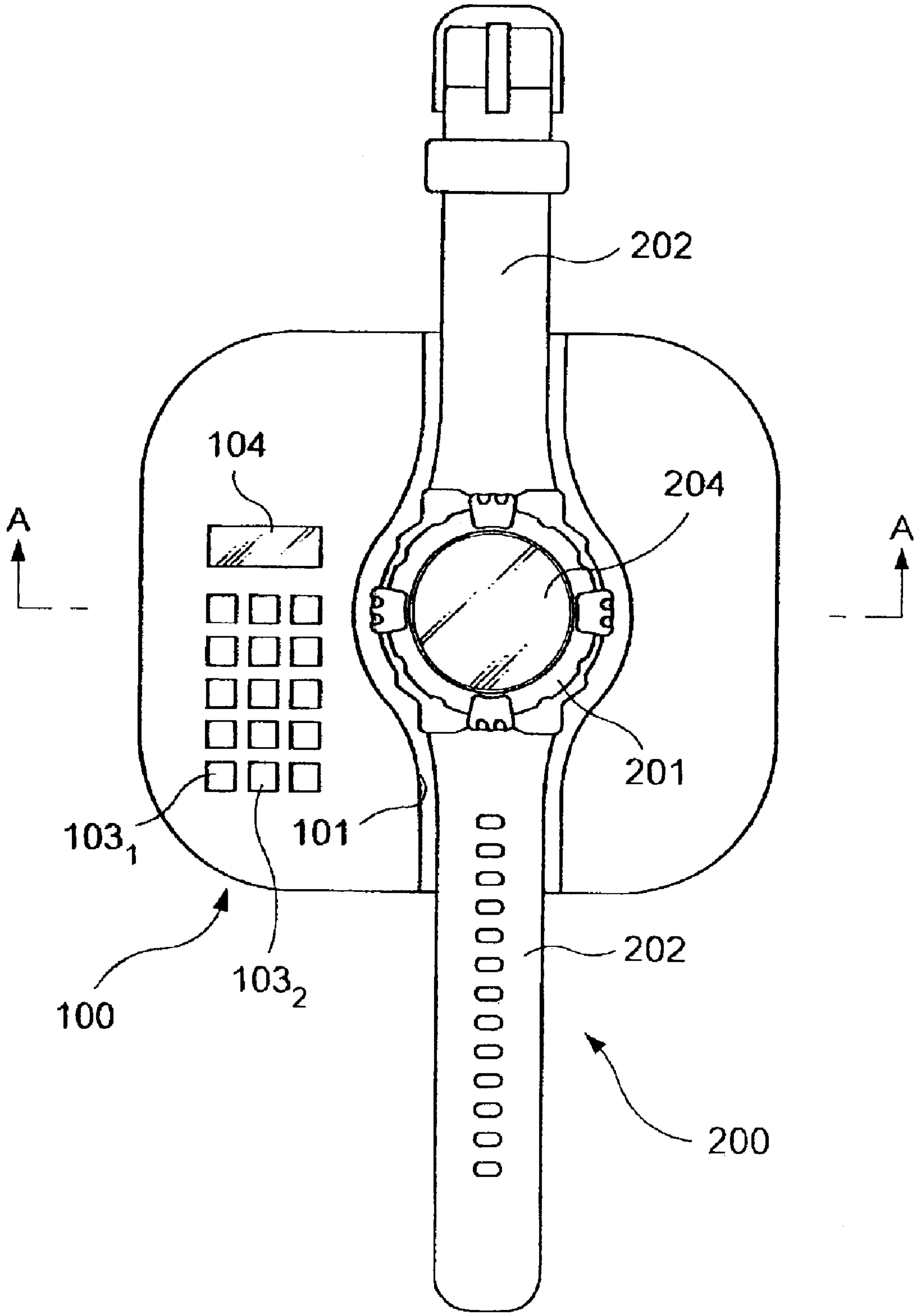
FIG. 1 is a plane view of a configuration of a station and an electronic timepiece of a first embodiment.

FIG. 1 is a diagram illustrating a station 100 and an electronic timepiece 200 of the first embodiment.

In FIG. 1, electronic timepiece 200 is placed in a concave section 101 of station 100 to recharge its battery or transfer data. Concave section 101 is made to be slightly larger than body 201 and band 202 of electronic timepiece 200 to enable electronic timepiece 200 to be embedded in concave section 101.

Station 100 has a recharging start button $\mathbf{103}_1$ for activating charging of battery, a transfer start button $\mathbf{103}_2$ for activating data transfer, and other buttons, and a display 104 for displaying a variety of information. Electronic timepiece 200 is worn on the wrist of a user, and displays a date and time. Electronic timepiece 200 also has an unshown sensor and periodically measures and stores a biological information such as the pulse rate and the heart rate.

Figure 2:
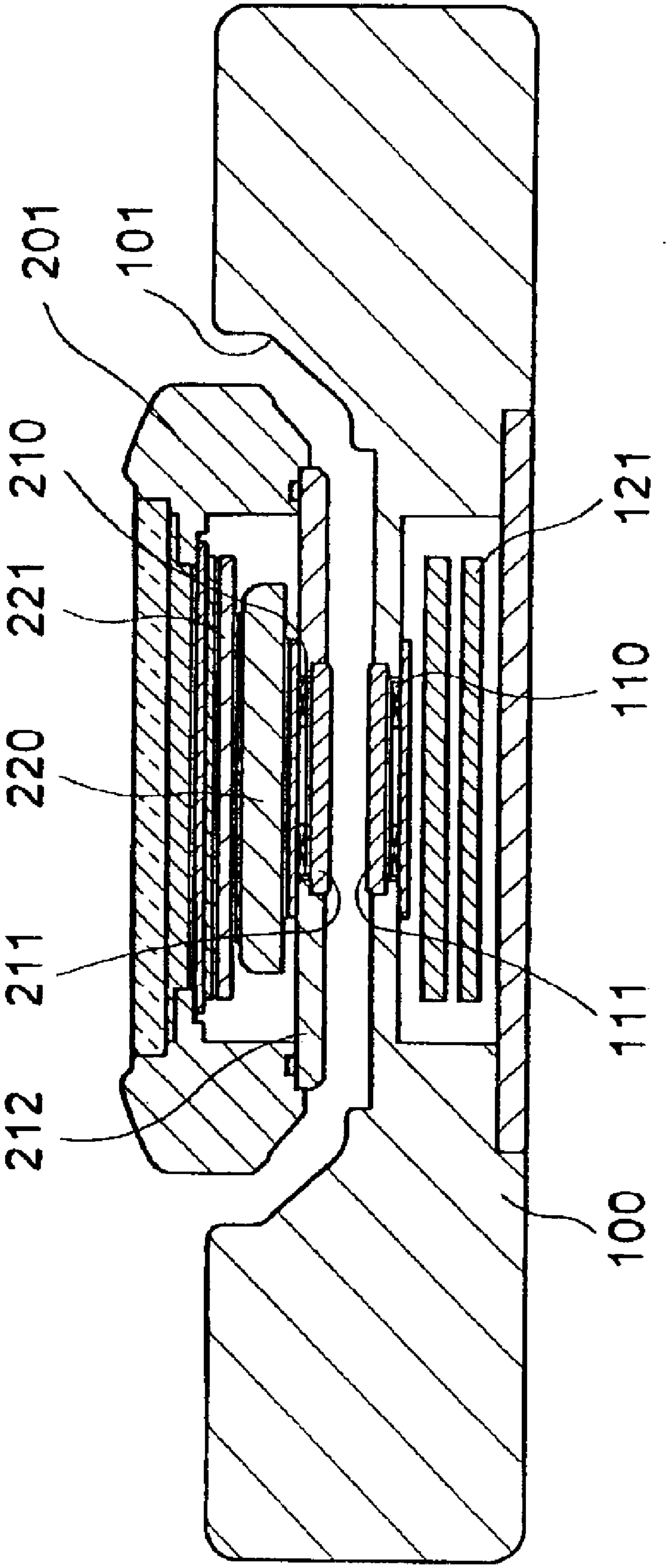
FIG. 2 is a sectional view taken along a line A—A in FIG. 1.

FIG. 2 is a sectional view taken along a line A—A in FIG. 1.

FIG. 2 shows a cross section of concave portion 101 of station 100 and electronic timepiece 200. Electronic timepiece 200 has a case back 212 with a cover glass 211. Inside cover glass 211 is a coil 210 for data transfer and recharging a battery. Watch body 201 also has a circuit substrate 221 that is connected to rechargeable battery 220 and coil 210.

Facing coil 210 of timepiece 200 is a coil 110 of station 100. Coil 110 is covered by a cover glass 111. Station 100 also has a circuit substrate 121 that is connected to coil 110, recharging start button $103_1$, transfer start button $103_2$, display 104, and a primary battery (not shown).

As described above, coil 110 of station 100 is not in contact with coil 210 of electronic timepiece 200. However, data transfer is effected by using these coils.

Coils 110 and 210 of station 100 and electronic timepiece 200 are not provided with magnetic cores, whereby the timepiece can be made lighter and mechanical parts of the timepiece are not magnetized. If weight and magnetic interference are not important factors in a device, coils with magnetic cores can be employed. However, if a signal fed to a coil has a sufficiency high frequency, it is not necessary to provide a magnetic core.

[1.2] Data in the Flash Memory

Figure 3:
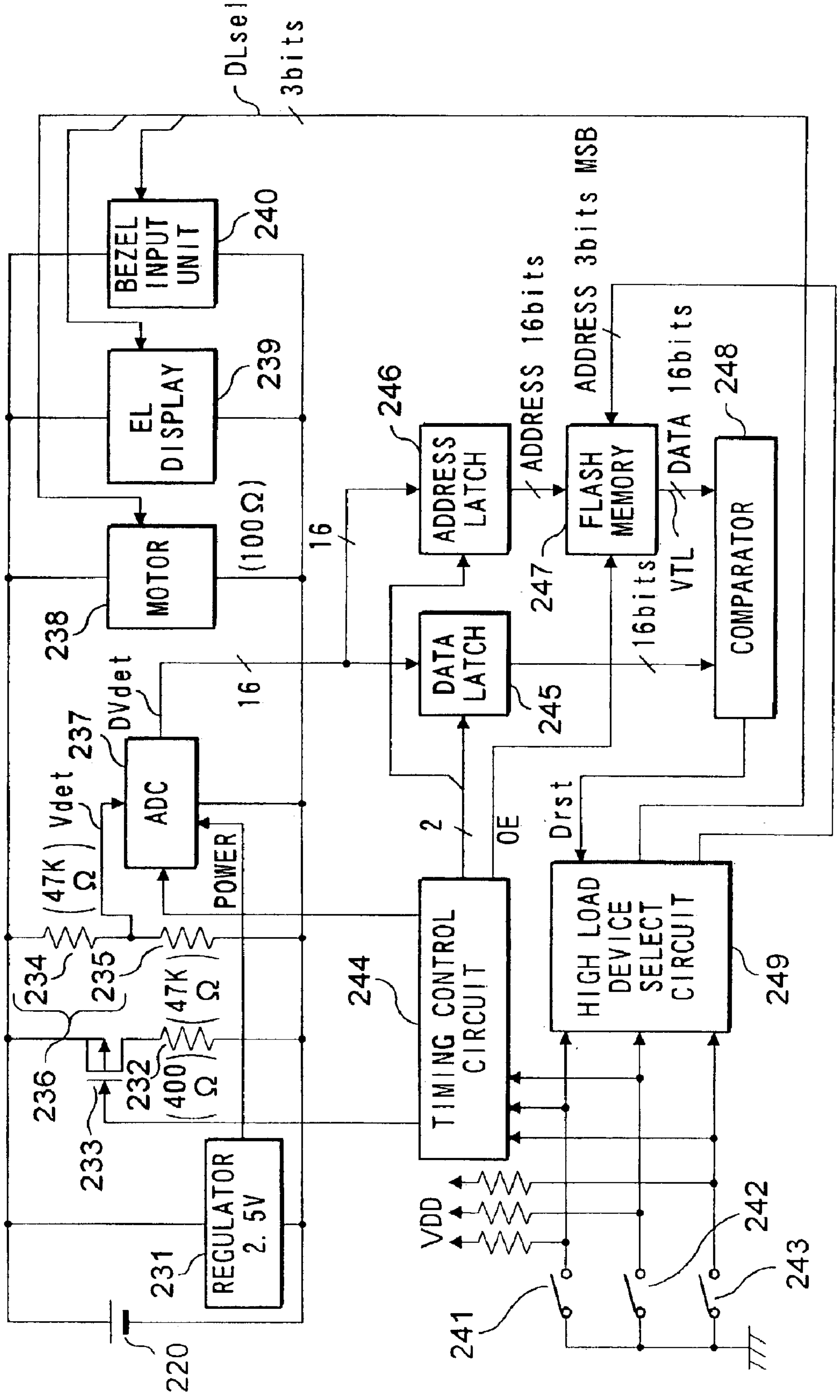
FIG. 3 is a block diagram illustrating an electronic configuration of the electronic timepiece of the first embodiment.

In FIG. 3, components of electronic timepiece 200 are shown. A flash memory 247 will be described first. Before shipment of electronic timepiece 200, a determination data VTL is stored in flash memory 247. During use of electronic timepiece 200, on the basis of this data VTL it is determined whether sufficient voltage charge remains in the battery of electronic timepiece 200 for a particular high load device to be driven. In the case that insufficient charge remains in the battery to enable a high load device to be used, there is danger that operation of electronic timepiece 200 itself will fail when an attempt is made to drive the high load device. Determination data VTL provides diagnostic criterion for preventing this kind of device failure. This data VTL is used after a consumer buys the electronic timepiece.

In FIG. 5, on the left, a structure of data VTL is shown where 19 bits represent an address: on the right, a structure is shown where 16 bits provide information about the address. Higher order 3 bits in an address indicate a function of the address.

For example, when an address has a higher order 3 bits of "000", it is determined that the address indicates a location where data for enabling only a bezel input unit 240 to be driven is stored. Data designated by the address is used in deciding whether there is sufficient battery charge for bezel input unit 240 to be driven.

Similarly if, for example, an address has a higher order 3 bits of "001", the address indicates a location where data for enabling only an EL display 239 is stored. Data designated by such an address is used when deciding whether EL display 239 can be driven.

When an address has a higher order 3 bits of "010", the address indicates a location where data for driving only a motor 238 is stored. The data designated by this address is used to determine whether it is possible for motor 238 to be driven.

For example, when an address has a higher order 3 bits of "011", the address indicates a location where data for enabling both bezel input unit 240 and EL display 239 at the same time to be used is stored. On the basis of this data it is also determined whether bezel input unit 240 and EL display 239 can be used at the same time.

For example, when an address has a higher order 3 bits of "100", the address indicates a location where data for enabling both bezel input unit 240 and motor 238 at the same time to be used is stored. On the basis of this data it is also determined whether bezel input unit 240 and motor 238 can be used at the same time.

In another example, when an address has a higher order 3 bits of "101", the address indicates a location where data for enabling both EL display 239 and motor 238 at the same time to be used is stored. On the basis of this data it is also determined whether EL display 239 and motor 238 can be used at the same time.

In yet another example, when an address has a higher order 3 bits of "110", the address indicates a location where data for enabling all of bezel input unit 240, EL display 239, and motor 238 at the same time to be used is stored. On the basis of this data it is also determined whether all of bezel input unit 240, EL display 239, and motor 238 can be used at the same time.

The succeeding 16 bits can have a value from "1111111111111111" to "0000000000000000". Therefore, the address for bezel input unit 240 can have a value from "0001111111111111111" to "0000000000000000000". After the data for each address is set, a table as shown in FIG. 6 can be obtained.

In FIG. 6, a data list of voltage is shown.

Since decimal digits are used, a binary value "1111111111111111" becomes "65535". This data "65535" appearing in the upper portion of FIG. 6 corresponds to a lower order 16 bits "1111111111111111", and this binary value has data "757".

In FIG. 6, data "65535" represents of 5 volts which is obtained when no load is imposed on the battery. Also, data "757" represents of 3.634 volts.

Thus, if a voltage of a battery with no load being imposed is 5 volts, and the load which will be imposed in using a high load device will result in voltage of the battery falling below 3.634 volts, it is determined that the high load device cannot be used.

Next, a method of forming data VTL in the first embodiment will be described.

When a lowest necessary voltage of battery 220 with a load imposed for driving an electric timepiece 200 is V4, the value of resistance of a dummy load provided by resistor 232 is RT, and the converted value of resistance of a high load device is RX.

Also, when the voltage of battery 220 with no load imposed is V0, a highest allowable internal resistance RL of rechargeable battery 220 is obtained by the following equation, $$RL=RX\cdot(V0-V4)/V4$$

The RL is a highest allowable value of internal resistance of rechargeable battery 220, therefore, when the battery has a higher internal resistance than the RL, electronic timepiece 200 is not able to operate.

When calculating the converted value of resistance RX, taking various loads required to drive the electronic timepiece into consideration enables more accurate control of the electronic timepiece.

Next, by using internal resistance RL, voltage VTL of rechargeable battery 220 with a resistor connected as a dummy load is obtained from the following equation, $$VTL=RT\cdot[V0/(RL+RT)]$$

The internal resistance RL used here is a highest allowable value, so the voltage VTL obtained is a lowest allowable voltage.

Namely, when rechargeable battery 220 has an internal resistance RL, the voltage V1 of battery 220 is required to be higher than voltage VTL to enable a high load device. In this case, it is determined that a voltage of battery 220 would not fall below a required value if the high load device is used, and there is thus no danger of the system failing.

Voltages VTL obtained by the above calculations and voltages V0 of the rechargeable battery with no load imposed are associated and stored in flash memory 247. Consequently, the tables shown in FIGS. 5 and 6 can be obtained.

In FIG. 5, voltage V0 is stored in the lower order 16 bits of the address in the flash memory 247, and a combination of high load devices is indicated in the higher order 3 bits, with voltage VTL being stored as data for the addresses.

To provide an adequate safety margin, instead of an actual change in voltage of rechargeable battery 220 from 4.1 to 3.0 volts, voltage from 5.0 to 2.5 volts is used. Then a calculation is performed to obtain and store voltage VTL as voltage of rechargeable battery 220 with no load being imposed changes from 5 to 2.5 volts in steps which are dependent on the resolution of an analog/digital converter 237.

Next, other components shown in FIG. 3 will be described.

The electronic timepiece 200 is equipped with rechargeable battery 220, a regulator 231, resistor 232, a transistor 233, a voltage dividing circuit 236, analog/digital converter (ADC) 237, motor 238, EL display 239, and bezel input unit 240.

The rechargeable battery 220 supplies power to the entire unit of electronic timepiece 200. In the following description, reference is made to a lithium ion rechargeable battery.

Regulator 231 is supplied with power from rechargeable battery 220 and generates a constant voltage (in this embodiment, 2.5 Volts) to analog/digital converter for use as a reference voltage.

Resistor 232 functions as a dummy load.

Transistor 233 is switched on and off under control of a timing control circuit, described later, to connect resistor 232 to rechargeable battery 220.

Voltage dividing circuit 236 has resistors 234 and 235 and divides the voltage of rechargeable battery 220 to generate a detection target voltage Vdet for determining a voltage of rechargeable battery 220.

ADC 237 performs analog-to-digital conversion on the detection target voltage Vdet under control of the timing control circuit to generate a detection target voltage data DVdet with 16 bits.

Motor 238 is a part of a vibrator and is a high load device.

EL display 239 is a high load device and displays information.

Bezel input unit 240 is a high load device, and is used for inputting data.

Electronic timepiece 200 also has a motor drive request switch 241, an EL display drive request switch 242, a bezel input unit drive request switch 243, timing control circuit 244, a data latch 245, an address latch 246, a flash memory 247, a comparator 248, and a high load device select circuit 249.

Using motor drive request switch 241, a request by a user or by a microprocessor that controls the entire electronic timepiece (not shown), is made to drive motor 238.

Using EL display drive request switch 242, a request by a user or by a microprocessor that controls the entire electronic timepiece (not shown), is made to drive EL display 239.

Using bezel input unit drive request switch 243, a request by a user or by a microprocessor that controls the entire electronic timepiece (not shown), is made to drive bezel input unit 240.

Timing control circuit 244 performs timing control for an operation such as voltage measurement when any of the motor drive request switch 241, EL display drive request switch 242, or bezel input unit drive request switch 243 is operated.

Data latch 245 latches the detection target voltage data DVdet output from ADC 237 when resistor 232 is connected to rechargeable battery 220 as a dummy load under control of timing control circuit 244.

Address latch 246 latches the detection target voltage data DVdet output from ADC 237 when resistor 232 is connected to rechargeable battery 220 as a dummy load. The latched data is stored as lower bits of the address in the flash memory under control of timing control circuit 244.

Flash memory 247 pre-stores 16 bit data values of voltage VTL, and, under control of timing control circuit 244, outputs a value of voltage VTL according to lower bits of the address output from address latch 246 and the higher 3 bits output from the high load device select circuit.

Comparator 248 compares the detection target voltage data DVdet and the value of voltage VTL to output a comparison result data Drst.

High load device select circuit 249 outputs load selection data DLsel having 3 bits based on operation of motor drive request switch 241, EL display drive request switch 242, and bezel input unit drive request switch 243, along with comparison result data Drst.

Timing control circuit 244 controls timings when to connect resistor 232 which is a dummy load to the rechargeable battery, when to store data by data latch 245 and address latch 246, when to output data from flash memory 247, when to switch transistor 233 ON, and when to convert data by ADC 237.

A value of resistor 232 which is a dummy load is preferably greater than one tenth of the converted value of resistance of a high load device. This is because it is difficult to measure accurately a voltage of the rechargeable battery, in the case that a value of resistance 232 is less than one tenth that of the high load device. The upper limit of the value of resistor 232 is lower than the converted value of the high load device and should impose as low a load as possible on the rechargeable battery.

[1.3] Operation of the First Embodiment

Figure 4:
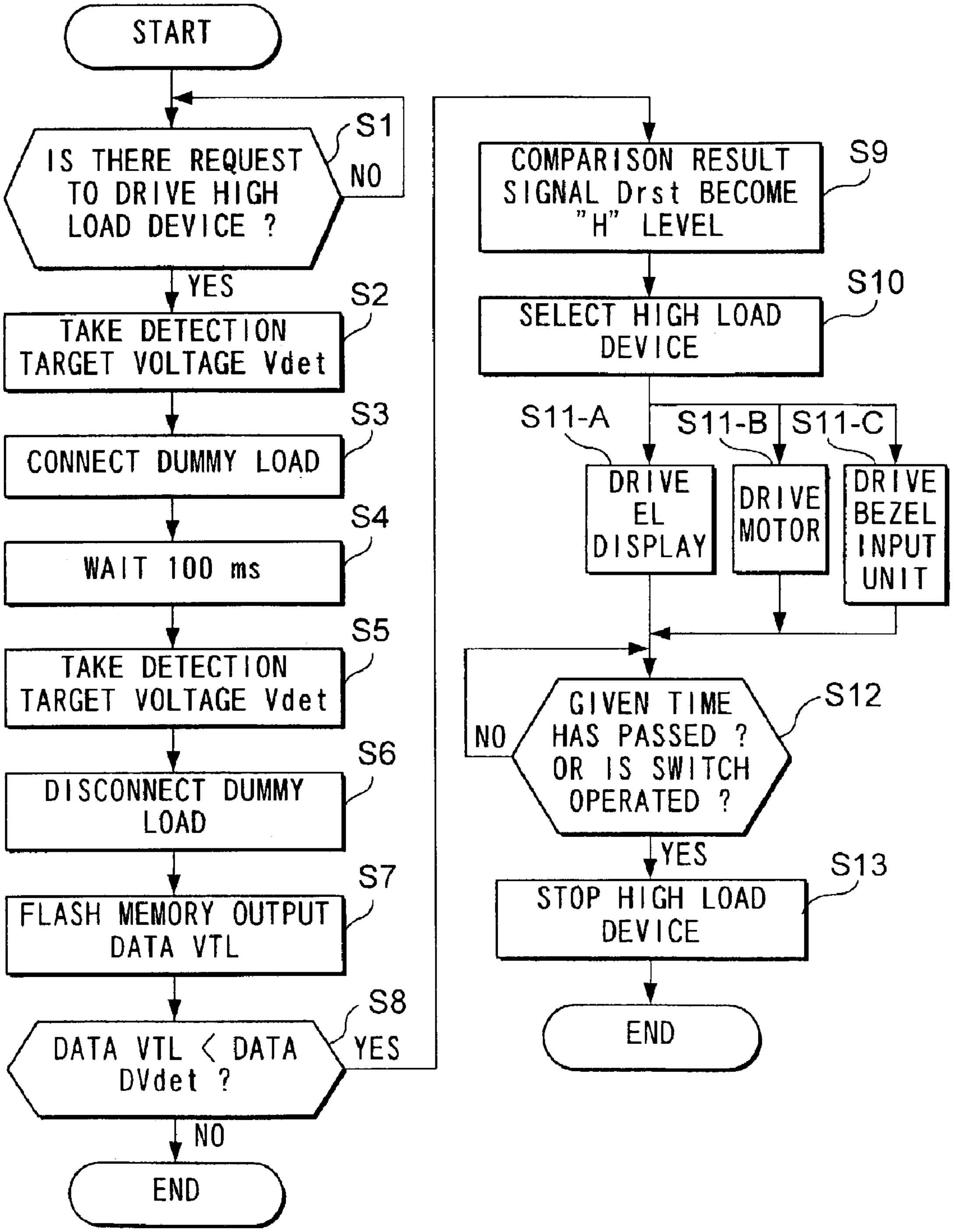
FIG. 4 is a flowchart illustrating an operation of the first embodiment.

Referring to FIG. 4, operation pertaining to the first embodiment will be explained.

At an initial state, transistor 233 is assumed to be OFF.

First, timing control circuit 244 determines if a high load device drive request exists based on operation of motor drive request switch 241, EL display drive request switch 242, or bezel input unit drive request switch 242 (step S1).

At step S1, when none of motor drive request switch 241, EL display drive request switch 242, or bezel input unit drive request switch 243 have been operated (step S1: NO), timing control circuit 244 remains in a wait state.

At step S1, when at least one of motor drive request switch 241, EL display drive switch 242, or bezel input unit drive request switch 243 is operated to make a request to drive motor 238, EL display 239, or bezel input unit 240 (step S1: YES), timing control circuit 244 drives ADC 237 and address latch 246 and causes address latch 246 to take detection target voltage Vdet which corresponds to a voltage of rechargeable battery 220 and is generated by voltage dividing circuit 236.

In the above case, detection target voltage Vdet will not be accurate if the rate of voltage change per unit time is not within a certain range. Such a situation may occur immediately after driving of a high load device stops. To avoid this problem, detection target voltage DVdet should preferably not be taken until a rate of voltage change per unit time falls within a specified range. Such a range should, for example, preferably be within 5 mV/msec, and more preferably within 0.5 mV/msec.

As a result, address latch 246 takes detection target voltage Vdet which corresponds to a voltage of rechargeable battery 220 when no load is imposed. Detection target voltage Vdet is detained as lower order bits of the address in flash memory 247.

Next, timing control circuit 244 turns transistor 233 ON to connect resistor 232 (step S3), which is a dummy load, to rechargeable battery 220.

Then in order to stabilize a voltage of rechargeable battery 220, timing control circuit 244 waits for a predetermined time period (in FIG. 4, 100 msec) (step S4). Stabilization of voltage in rechargeable battery 220 in this case means that the rate of the voltage change per unit time is within a predetermined value. The predetermined value is preferably 5 mV/msec, and more preferably 0.5 mV/msec.

Next, timing control circuit 244 drives ADC 237 and data latch 245 and causes data latch 245 to take detection target voltage Vdet which corresponds to a voltage of rechargeable battery 220 with resistor 232 connected as a dummy load (step S5).

As a result, data latch 245 retains detection target voltage Vdet.

Then, to avoid unnecessary power consumption, timing control circuit 244 turns transistor 233 to OFF to disconnect resistor 232 (step S6) from rechargeable battery 220.

At the same time, high load device select circuit 249 outputs the higher order 3 bits of the address based on operative state of motor drive request switch 241, EL display drive request switch 242, and bezel input unit drive request switch 243.

While address latch 246 outputs to flash memory 247 the lower order bit of the address, and high load device select circuit 249 outputs the higher order bit of the address, timing control circuit 244 turns an output approval signal OE to the "H" level. As a result, flash memory 247 outputs to comparator 248 voltage VTL as determination data VTL which is digital data with 16 bits (step S7).

Determination data VTL corresponds to a lowest allowable voltage of rechargeable battery 220 for motor drive request switch 241, EL display drive request switch 242, or bezel input unit drive request switch 243.

Comparator 248 then compares detection target voltage data DVdet output from data latch 245 with determination data VTL output from flash memory 247 (step S8), and then outputs a comparison result data Drst.

When detection target voltage data DVdet is lower than determination data VTL (step S8: NO), high load device select circuit 249 will finish the function without driving any of motor 238, EL display 239, or bezel input unit 240: otherwise the voltage of rechargeable battery 220 would fall below a minimum voltage required to drive electronic timepiece 200.

Conversely, in the case that detection target voltage data DVdet has a higher value than that of determination data VTL (step S8: YES), comparison result signal Drst output from comparator 248 becomes the "H" level (step S9). Thus, high load device select circuit 249 selects the high load device based on the state of motor drive request switch 241, EL display drive request switch 242, and bezel input unit drive request switch 243 (step S10).

Next, high load device select circuit 249 outputs high load device selection data DLsel with 3 bits to select high load device to be driven out of motor 238, EL display 239, and bezel input unit 240 based on the operation states of motor drive request switch 241, EL display drive request switch 241, and bezel input unit drive request switch 242 and comparison result data Drst.

High load device select circuit 249 determines if high load device driven at step S11-A, S11-B or S11-C has been driven for a predetermined time, and also if motor drive request switch 241, EL, display drive request switch 242, and bezel input unit drive request switch 243 are turned to non-operative state (step S12).

When a determination of step S12 is NO, high load device select circuit 249 remains in a wait state.

When a determination of step S12 is YES, high load device select circuit 249 outputs high load device selection data DLsel with 3 bits causing the device to cease operation, and to process shown in the flowchart is terminated.

[1.4] Effect of the First Embodiment

As described, according to the first embodiment, it is possible to determine rapidly whether a high load device can be driven; and this determination can be made without the need for complicated calculation. As a result, it is possible to avoid system failure of the electronic timepiece which would otherwise occur due to a fatal decline in battery voltage during use of a high load device.

[2] Second Embodiment

[2.1] Electrical Configuration

Figure 7:
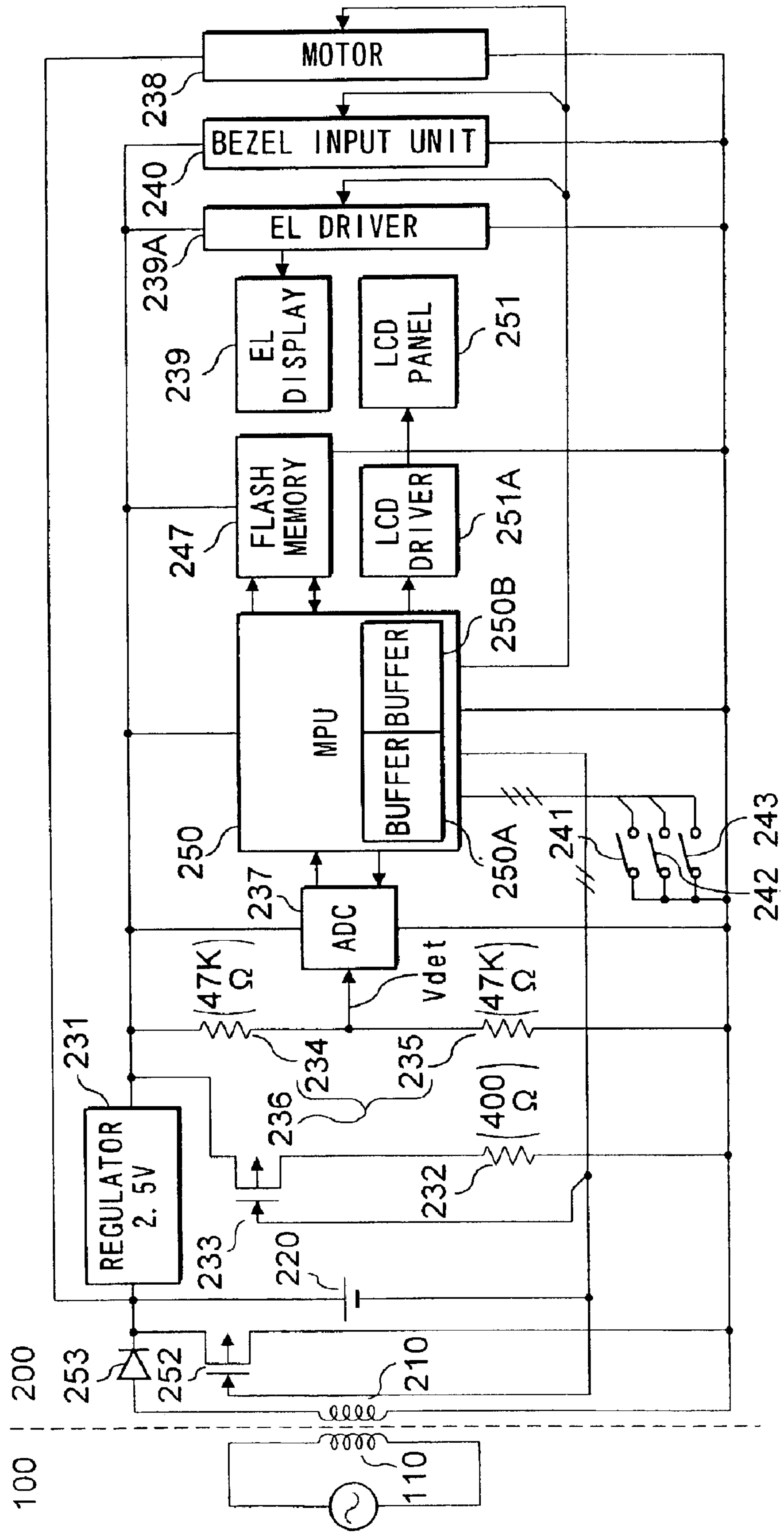
FIG. 7 is a block diagram illustrating an electrical configuration of the electronic timepiece of the second embodiment.

A station and an electronic timepiece of the second embodiment are almost the same as of the first embodiment. Only an electric circuit of the electronic timepiece is different. Referring to FIG. 7, the electrical configuration of the second embodiment will be described. In FIG. 7, the same reference numerals are applied to the same units in FIG. 3.

Electronic timepiece 200 has a battery 220, a regulator 231, a resistor 232, a transistor 233, a voltage dividing circuit 236, an analog/digital converter (ADC) 237, a motor 238, an EL display 239, and a bezel input unit 240.

Rechargeable battery 220 supplies power to the entire units of electronic timepiece 200.

Regulator 231 is supplied with power from rechargeable battery 220 to output as a reference voltage a constant voltage (in the second embodiment, 2.5 Volts) to an analog/digital converter, which converter will be explained in more detail later.

Resistor 232 functions as a dummy load.

Transistor 233 is switched ON and OFF to connect and disconnect resistor 232 with rechargeable battery 220 under control of a micro-processing unit (MPU) 250 which is described later.

Voltage dividing circuit 236 is made of resistors 234 and 235 and divides voltage of rechargeable battery 220 to generate the detection target voltage for determining voltage of rechargeable battery 220.

ADC 237 performs analog-to-digital conversion on detection target voltage Vdet under control of MPU 250 to output detection target voltage data Dvdet with 16 bits.

Motor 238 is one part of a vibrator and is a high load device.

EL display 239 is a high load device and is driven by an EL driver 239A to display information.

Bezel input unit 240 is a high load device and is used for inputting data.

In this case, motor 238 is assumed to be supplied with power directly from rechargeable battery 220. EL display 239 and bezel input unit 240 are assumed to be supplied with power via regulator 231.

Electronic timepiece 200 is also equipped with motor drive request switch 241, EL display drive request switch 242, bezel input unit drive request switch 243, MPU 250, an LCD panel 251, a switch 252 for discharging, and a diode 253.

Motor drive request switch 241 is used for a user to request to drive motor 238.

EL display drive request switch 242 is used for a user to request to drive EL display 239.

Bezel input unit drive request switch 243 is used for a user to request to drive bezel input unit 240.

MPU 250 controls the entire unit of electronic timepiece 200.

LCD panel 251 is driven by LCD driver 251A to display information.

Switch 252 for discharging functions as a limiter switch for preventing from overcharging rechargeable battery 220.

Diode 253 controls the direction of the charging current.

MPU 250 is equipped with first buffer 250A and second buffer 250B for storing data.

Also, MPU 250 carries out functions of timing control circuit 244, data latch 245, address latch 246, comparator 248, and high load device select circuit 249 which are explained in the first embodiment.

[2.2] Operation of the Second Embodiment

Figure 8:
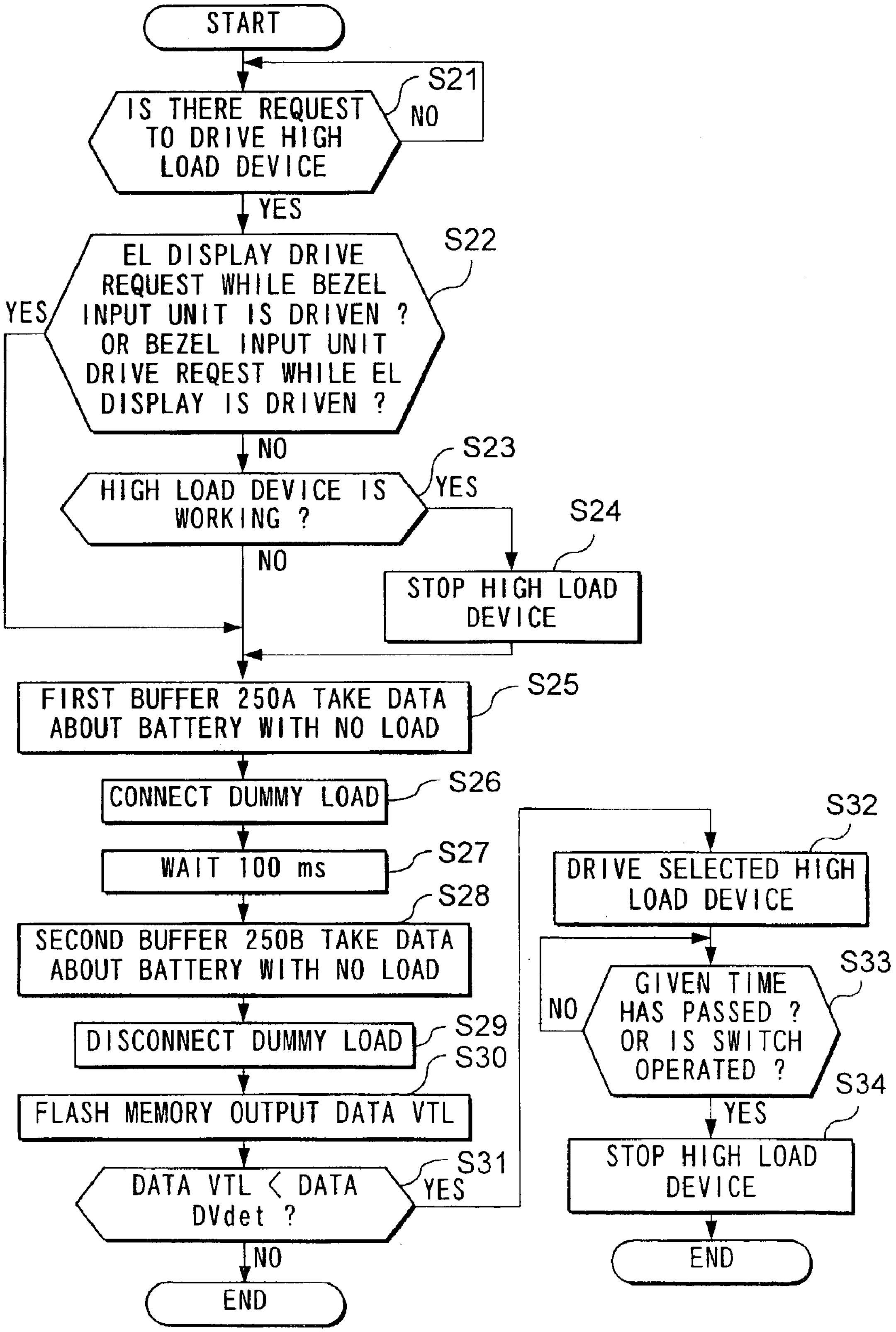
FIG. 8 is a flowchart illustrating an operation of the second embodiment.

Referring to the flowchart shown in FIG. 8, operation of the second embodiment will now be described.

At first, transistor 233 is assumed to be OFF.

First, MPU 250 determines whether high load device drive request exists based on operation of motor drive request switch 241, EL display drive request switch 242, or bezel input unit drive request switch 242 (step S21).

At step S21, when all motor drive request switch 241, EL display drive request switch 242, and bezel input unit drive request switch 243 have not been operated (step S21: NO), MPU 250 remains waiting.

When determination at step S21 is YES, MPU 250 makes a judgement if EL display drive request switch 242 was operated during driving bezel input unit 240, or if bezel input unit drive request switch 243 was operated during driving EL display 239 (step S22).

When EL display drive request switch 242 was operated during driving bezel input unit 240, or when bezel input unit drive request switch 243 was operated during driving EL display 239 (step S22: YES), the process of the flowchart goes to step S25.

When EL display drive request switch 242 was not operated during driving bezel input unit 240, and bezel input unit drive request switch 243 was not operated during driving EL display 239 (step S22: NO), MPU 250 makes a judgement if any one of the high load device is being driven (step S23).

At step S23 judgement, when any one of the high load device is being driven (step S23: YES), MPU 250 stops the high load device (step S24), and the process of the flowchart goes to step S25.

At judgement at step S23, when any one of the high load device is not being driven (step S23: NO), MPU 250 makes first buffer 250A take detection target voltage Vdet generated by voltage dividing circuit 236.

In the above case, detection target voltage Vdet is not accurate if the rate of voltage change per unit time is not within a certain range. This might happen just after a high load device stops driving. Therefore, detection target voltage DVdet should preferably not be taken until the rate of voltage change per unit time becomes within a certain range. This range, for example, is preferably within a 5 (mV/msec), and more preferably within a 0.5 (mV/msec).

As a result, first buffer 250A retains detection target voltage Vdet which corresponds to voltage of the rechargeable battery with no load being imposed as the lower order bit of the address in flash memory 247.

MPU 250 then turns transistor 233 to ON (step S26) to connect resistor 232 with rechargeable battery 220 as a dummy load.

Then in order to stabilize the voltage of rechargeable battery 220, MPU 250 waits for a predetermined time period (in FIG. 8, 100 msec) (step S27). Stabilization of voltage in rechargeable battery 220 in this case means that the rate of the voltage change per unit time is within a predetermined value. The predetermined value is preferably 5 (mV/msec), and more preferably 0.5 (mV/ msec).

Next, MPU 250 drives ADC 237 and makes second buffer 250B take detection target voltage Vdet which corresponds to the voltage of rechargeable battery 220 with resistor 232 connected as a dummy load (step S28).

As a result, second buffer 250B retains detection target voltage Vdet that corresponds to voltage of rechargeable battery 220 with resistor connected as a dummy load.

Then, MPU 250 turns transistor 233 to OFF state (step S29) to disconnect resistor 232 from rechargeable battery 220. This suppresses unnecessary power consumption.

At the same time, MPU 250 outputs the higher order 3 bits of the address data based on the operation state of motor drive request switch 241, EL display drive request switch 242, and bezel input unit drive request switch 243.

While MPU 250 outputs to flash memory 247 the lower order bit of the address and the higher order bit of the address, MPU 250 makes an output approval signal OE to the “H” level. By this, flash memory 247 outputs determination data VTL which is digital data with 16 bits (step S30).

Determination data VTL corresponds to a lowest allowable voltage of rechargeable battery 220 for motor drive request switch 241, EL display drive request switch 242, or bezel input unit drive request switch 243.

MPU 250 then compares detection target voltage data DVdet in second buffer 250B with determination data VTL output from flash memory 247 (step S31), then makes a judgement if the determination data VTL is smaller than detection target voltage data DVdet.

When detection target voltage data DVdet is lower than determination data VTL (step S31: NO), MPU 250 finishes the function without driving any of motor 238, EL display 239, or bezel input unit 240. This is because in the above case the driving any one of the high load devices will lower the voltage of rechargeable battery 220 below the lowest voltage for driving electronic timepiece 200.

Then a message such as “please recharge the battery.” will be shown on LCD display 251.

When this message is shown, rechargeable battery 220 does not have much electricity, and can be recharged by placing electronic timepiece on station 100.

After recharging the battery, when the voltage of rechargeable battery 220 exceeds a predetermined voltage (for example, 4 volts for lithium-ion battery) by recharging the battery, switch 252 for discharging is turned ON to stop recharging.

When detection target voltage data DVdet is higher than determination data VTL (step S31: YES), MPU 250 drives the selected high load device (step S32), because rechargeable battery 220 has enough electricity to drive it.

Then MPU 250 makes a judgement if the high load device driven at step S32 is driven for a time period predetermined for each high load device, and if the operation states of motor drive request switch 241, EL display drive request switch 242, and bezel input unit drive request switch 243 is switched to non-operation state (step S33).

When the judgement of step S33 is NO, MPU 250 remains waiting.

When the judgement of step S33 is YES, MPU 250 stops the selected high load device (step S34), and the process of the flowchart ends.

[2.3] Effect of the Second Embodiment

As described, according to the second embodiment, it is possible to make a quick judgement if a high load device can be driven. This judgement can be done without complicated calculation. By this judgement, the system of electronic timepiece 200 does not fail due to the decline of the voltage incurred by the drive of the high load device.

Also, even when some high load devices are connected to the rechargeable battery and at the same time some high load devices are connected to the regulator, it is possible to make a quick judgement if a high load device can be driven. Also, this judgement does not halt the system of electronic timepiece 200 due to the decline of the voltage incurred by the drive of the high load device.

[2.4] Modifications of the Second Embodiment

Processes at steps S24 through S28 may be automatically conducted in a predetermined cycle when no high load device is being driven. Then the newest output value of ADC 237 may be retained. By these, there will be no necessity to stop the high load device at step S24.

[3] Third Embodiment

A station and an electronic timepiece of the third embodiment are the same as of the first embodiment, but an electrical configuration of the electronic timepiece First, an explanation will be given of a data making method for the flash memory.

As described, there are cases where some high load devices are connected to the rechargeable battery and at the same time some high load devices are connected to the regulator. In these cases, by using a combined resistance and resistance of the regulator, highest allowable internal resistance RL is calculated for each high load device. Then data for the high load device with the severest condition for driving is stored in flash memory 247.

Voltage V01 of the rechargeable battery with no load being applied is associated with address in flash memory 247 and then is assigned as voltage VTL.

Then voltage V0 is varied to make a table.

From here, an explanation will be given using actual examples of the following conditions.

Battery voltage with no load connected is 3.5 Volts.

Output voltage of the regulator is 2.5 Volts.

Value of resistance converted from voltage drop of the regulator is 10 (Ω).

Lowest required voltage V4 to drive a high load device (motor) is 2 Volts.

Lowest required voltage V4 to drive a high load device (EL display or Bezel input unit) is 2.5 Volts.

Load resistance Rmo of the motor is 100 (Ω).

Load resistance of the EL display is 200 (Ω).

Load resistance of the bezel input unit is 1000 (Ω).

When the above values are given, explanation is given of a case where the bezel input unit and the EL display are driven at the same time.

From here, in order to make the explanation simple, an assumption is used that only motor 238 is connected to rechargeable battery 220 and bezel input unit 240 and EL display 239 are connected to regulator 231. In an actual case, when there are a plurality of loads connected to rechargeable battery 220, a combined resistance of these loads may be used as a resistance connected to the battery. Also, when there are a plurality of loads connected to regulator 231, a combined resistance of these loads may be used as a resistance connected to regulator 231.

From conditions mentioned above, the motor connected to the battery is equivalent to 100Ω, and a combined resistance of EL display 239 and bezel input unit 240 both connected to regulator 231 is equivalent to 166Ω.

From these, a highest allowable internal resistance of rechargeable battery 220 to drive a high load device is calculated.

A highest allowable internal resistance RLmt to drive motor 238 can be obtained from the following equation.

$$RLmt=(V0-V4)/((V4/Rmo)+(V4/(Reb+REGd)))$$

Applying the above value, the following value is calculated.

$$RLmt=(3.5-2)/((2/100)+(2/(166+10)))=50.8\Omega$$

On the other hand, a highest allowable internal resistance RLel of rechargeable battery 220 to drive EL display 239 connected to regulator 231 can be obtained from the following equation.

$$RLel=(V0-(V4+REGd\cdot V4/Reb))/((V4/Reb)+((V4\cdot REGd/Reb)+V4)/Rem)$$

Applying the above value, the following value is calculated.

$$RLel=(3.5-(2.5+10\cdot 2.5/166))/((2.5/166)+((2.5\cdot 10/166)+2.5)/100)=20.43\Omega$$

Similarly, a highest allowable internal resistance RLbz of rechargeable battery 220 to drive bezel input unit 240 can be obtained.

$$RLbz=20.43\Omega$$

RLel and RLbz are the lowest among the highest allowable internal resistance RLmt, RLel, and RLbz. So RLel or RLbz is stored in the flash memory.

FIG. 5 shows a relation between a table for driving high load device and addresses in flash memory 247.

Configuration of the data is the same as that in the first embodiment, so explanation of the data is not given.

Also, other data making method is explained for a case where there is a load connected to rechargeable battery 220 and a load connected to regulator 231 and these loads are driven at the same time with a voltage of the rechargeable battery lower than a rated voltage of regulator 231.

Here, following reference symbols are used:

a voltage of the rechargeable battery with no load being connected is V0, a voltage of the rechargeable battery with a dummy load being connected is V1, a lowest required voltage of the rechargeable battery with a load being connected is V4, a value of resistance of a dummy load is RT, a value of resistance of a battery-driven device to be driven is Rmo, a value of resistance of a regulator-driven device to be driven is Reb, a rated voltage of the regulator is REGout, a converted resistance from voltage drop of the regulator is REGd, REGdd is conversion factor for resistance for voltage drop of the voltage regulator in a case where voltage of the power supply is lower than constant voltage REGout, In this case, highest allowable internal resistance RL for driving values Rmo and Reb are obtained from the equation below.

(1) value of allowable resistance RL1 for value Rmo $$RL1=(V0-V4)/((V4/Rmo)+V4/(Reb+REGd+(REGdd\cdot(REGout-V4))))$$

(2) value of allowable resistance RL2 for value Reb $$RL2=(V0-(V4+V4\cdot(REGd+REGdd\cdot(REGout-V4))/Reb))/((V4/Reb)+(((V4\cdot(REGd+REGdd\cdot(REout-V4))/Reb)+V4/Rmo))$$

Then RL1 and RL2 are compared, and the value of the lower is set to the highest allowable internal resistance RL.

Next, when the internal resistance of the rechargeable battery is the highest allowable internal resistance RL, a voltage VTL of the rechargeable battery with a dummy load having a resistance RT being connected is calculated by using a following equation.

$$VTL=RT\cdot(V0/(RL+RT))$$

Then voltage V0 of the rechargeable battery with no load being connected is associated to address in flash memory 247. VTL obtained above is set as data for these addresses. Then voltage V0 is varied to obtain VTL. Consequently, table shown in FIG. 6 can be obtained.

[3.1] Operation of the Third Embodiment

Figure 9:
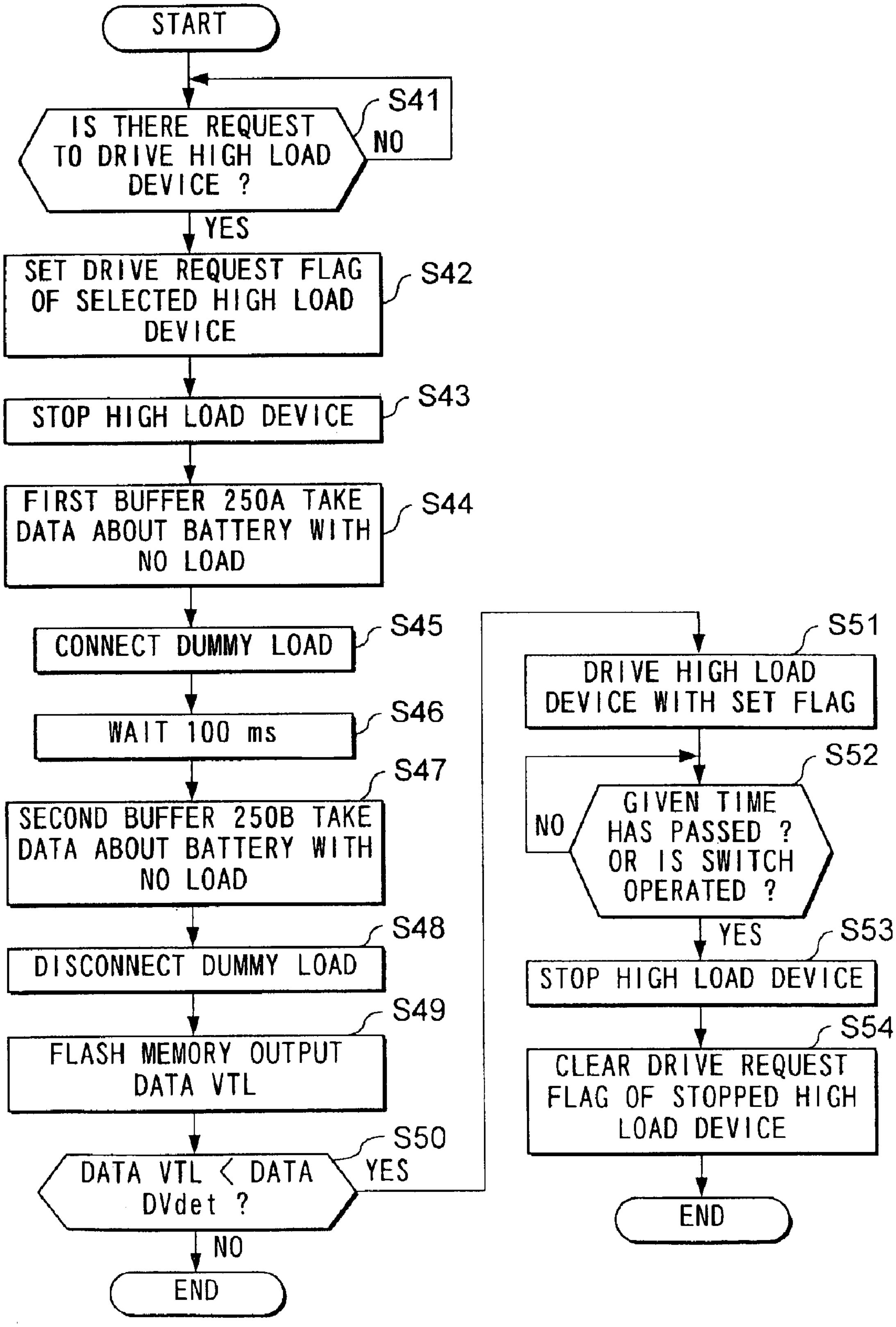
FIG. 9 is a flowchart illustrating an operation of the third embodiment.

Referring to the flowchart shown in FIG. 9, the operation of the third embodiment will be described.

At the initial state, transistor 233 is in the OFF state.

First, MPU 250 makes a judgement if there is a high load device drive request based on the operation of motor drive request switch 241, EL display drive request switch 242, and bezel input unit drive request switch 242 (step S41).

At step S41, when all motor drive request switch 241, EL display drive request switch 242, and bezel input unit drive request switch 243 have not been operated (step S41: NO), MPU 250 remains waiting.

At step S41, when at least any one of motor, EL panel, or bezel input unit is request to drive, a drive request flag is set for the requested high load device (the flag is turned to the ON state) (step S42).

Then MPU 250 stops operating high load device (step S43).

Then MPU 250 makes first buffer 250A take detection target voltage Vdet generated by voltage dividing circuit 236 (step S44).

In the above case, detection target voltage Vdet is not accurate if the rate of voltage change per unit time is not within a certain range. This might happen just after a high load device stops driving. Therefore, the detection target voltage DVdet is preferably not taken until the rate of the voltage change per unit time becomes within a certain range. This range, for example, is preferably within a 5 (mV/msec), and more preferably within a 0.5 (mV/msec).

As a result, first buffer 250A retains detection target voltage Vdet as the lower order bit of the address in flash memory 247.

MPU 250 then turns transistor 233 ON (step S45) to connect resistor 232 with rechargeable battery 220 as a dummy load.

Then in order to stabilize voltage of rechargeable battery 220, MPU 250 waits for a predetermined time period (in FIG. 9, 100 msec) (step S46). Stabilization of voltage in rechargeable battery 220 in this case means that the rate of the voltage change per unit time is within a predetermined value. The predetermined value is preferably 5 (mV/msec), and more preferably 0.5 (mV/msec).

Next, MPU 250 drives ADC 237 and makes second buffer 250B take detection target voltage Vdet which corresponds to the voltage of rechargeable battery 220 with resistor 232 connected as a dummy load (step S47).

As a result, second buffer 250B retains detection target voltage Vdet that corresponds to voltage of rechargeable battery 220 with resistor connected as a dummy load.

Then, MPU 250 turns transistor 233 to the OFF state (step S48) to disconnect resistor 232 from rechargeable battery 220. This suppresses unnecessary power consumption.

At the same time, MPU 250 outputs to flash memory 247 the higher order 3 bits of the address based on the operation state of motor drive request switch 241, EL display drive request switch 242, and bezel input unit drive request switch 243.

While MPU 250 outputs to flash memory 247 the lower order bit of the address and the higher order bit of the address, MPU 250 makes an output approval signal OE to the "H" level. By this, flash memory 247 outputs determination data VTL which is digital data with 16 bits (step S49).

Determination data VTL corresponds to a lowest allowable voltage of rechargeable battery 220 for motor drive request switch 241, EL display drive request switch 242, or bezel input unit drive request switch 243.

MPU 250 then compares detection target voltage data DVdet in second buffer 250B with determination data VTL output from flash memory 247 (step S50), then makes a judgement if the determination data VTL is smaller than detection target voltage data DVdet.

When detection target voltage data DVdet is lower than determination data VTL (step S50: NO), MPU 250 does not drive motor 238, EL display 239, or bezel input unit 240 with the set drive request flag. This is because in the above case driving any one of the high load devices will lower the voltage of rechargeable battery 220 below the minimum voltage for driving electronic timepiece 200.

Then a message such as "please recharge the battery." will be shown on LCD display 251.

When this message is shown, rechargeable battery 220 does not much electricity, so electronic timepiece 200 is placed on station 100. Then rechargeable battery 220 is recharged.

After recharging the battery, when the voltage of rechargeable battery 220 exceeds a predetermined voltage (for example, 4 volts for lithium-ion battery), switch 252 for discharging is turned ON to stop recharging.

When detection target voltage data DVdet is higher than determination data VTL (step S50: YES), MPU 250 drives the high load device with the drive request flag being set (step S51), because rechargeable battery 220 has enough electricity to drive it.

Then MPU 250 makes a judgement if the high load device driven at step S51 is driven for a time period predetermined for each high load device, and if the operation states of motor drive request switch 241, EL display drive request switch 242, and bezel input unit drive request switch 243 is switched to non-operation state (step S52).

When the judgement of step S52 is NO, MPU 250 remains waiting.

When the judgement of step S52 is YES, MPU 250 stops the selected high load device (step S53) and clears the drive request flag for the selected high load device (step S54), and the process of the flowchart ends.

[3.2] Effect of the Third Embodiment

As described, according to the third embodiment, it is possible to make a quick judgement if a high load device can be driven. This judgement can be done without complicated calculation. By this judgement, the system of the electronic timepiece does not fail due to the decline of the voltage incurred by the drive of the high load device.

Also, even when some high load devices are connected to the rechargeable battery and at the same time some high load devices are connected to the regulator, it is possible to make a quick judgement if a high load device can be driven. Also, this judgement does not halt the system of electronic timepiece 200 due to the decline of the voltage incurred by the drive of the high load device.

[4] Modifications of the First, the Second, and the Third Embodiments

[4.1] First Modification

In the above explanations, a rechargeable battery is used as a power supply. However, a primary battery may be also used as a power supply in the present invention.

[4.2] Second Modification

In the above explanation, only one high load device is driven. However, when there are more than one high load devices and a plurality of high load devices are driven at the same time, the composed value of all the converted resistances from the driven devices can be used as the converted resistance.

[4.3] Third Modification

In the above explanation, the station 100 is used as battery charger and electronic timepiece 200 is used as a recharged device. However, the present invention may be applied to all the electronic apparatus with devices whose power consumption is relatively high like a flash memory. The present invention can also be applied to a battery charger and a rechargeable device with a rechargeable battery and a high load device such as a cordless phone, a mobile telephone, a personal handy phone, or a portable computer, a personal digital assistance (PDA). And the high load device may be a flash memory, an electroluminescence (EL) display, a vibrator motor, a buzzer, or an LED.

[5] Fourth Embodiment

Figure 10:
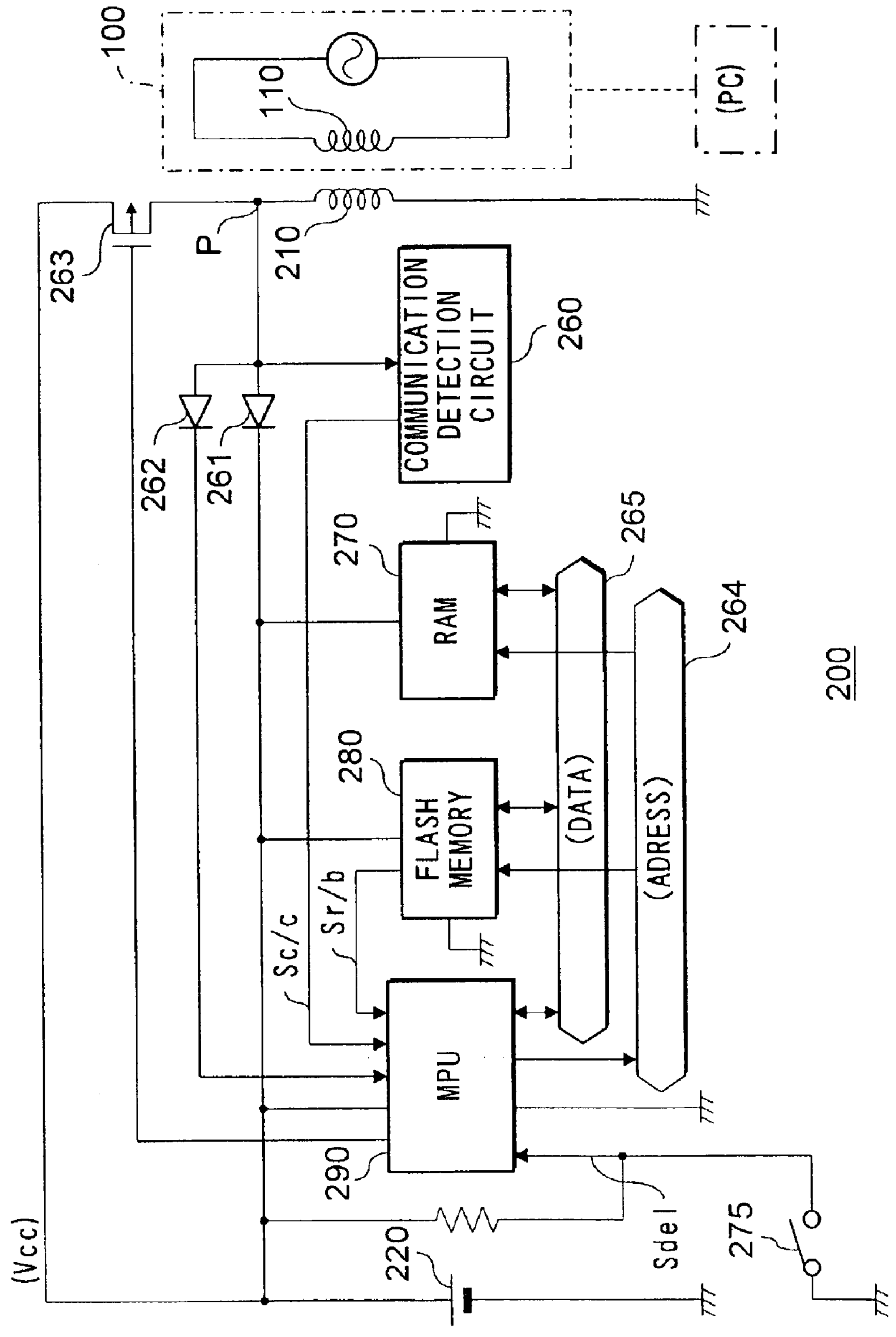
FIG. 10 is a block diagram illustrating an electrical configuration of the electronic timepiece of the fourth embodiment.

A station and an electronic timepiece of the fourth embodiment are almost the same as of the first embodiment. Only an electric circuit of the electronic timepiece is different. Therefore, referring to FIG. 10, the electrical configuration of electronic timepiece 200 of the fourth embodiment will be described.

A coil 210 of electronic timepiece 200 has one terminal P connected to the positive terminal of rechargeable battery 220 via a diode 261 and other terminal connected to the negative terminal of rechargeable battery 220.

When pulse signals are fed to coil 110 of the station, magnetic field is induced around coil 110. This magnetic field induces voltage in coil 210 of electronic timepiece 200. By this induced voltage, current flows to rechargeable battery 220 after rectified by diode 261. Rechargeable battery 200 is used as a power supply.

Electronic timepiece 200 has a microprocessor unit (MPU) 290 that controls signal transmission, measures voltage of battery, and controls the entire units of the electronic timepiece. MPU 290 receives signals transmitted by station 100 via diode 262.

When MPU 290 transmits data to a personal computer that is connected to station 100, MPU 290 drives and uses transistor 263 to transmit data.

MPU 290 also controls writing and reading files in flash memory 280 by referring a file deleting request signal Sdel, a recharging and/or communication judgement signal Sc/c, and a ready/busy signal Sr/b, and by using an address bus 264 and a data bus 265.

Here, file deleting request signal Sdel is turned to the "L" level when a file deleting request switch 275 is turned ON.

The recharging and/or communication judgement signal Sc/c is output by a communication detection circuit 260 that detects if electronic timepiece 200 is charged by station 100 or is conducting communication with station 100 by using data for judgement output from station 100.

Ready/busy signal Sr/b is output from flash memory 280.

Flash memory 280 stores data even after power is turned off.

[5.1] Operation of the Fourth Embodiment

Next, an operation of the fourth embodiment will be described by using an erasing operation of the high power consuming flash memory 280 as an example.

Figure 11:
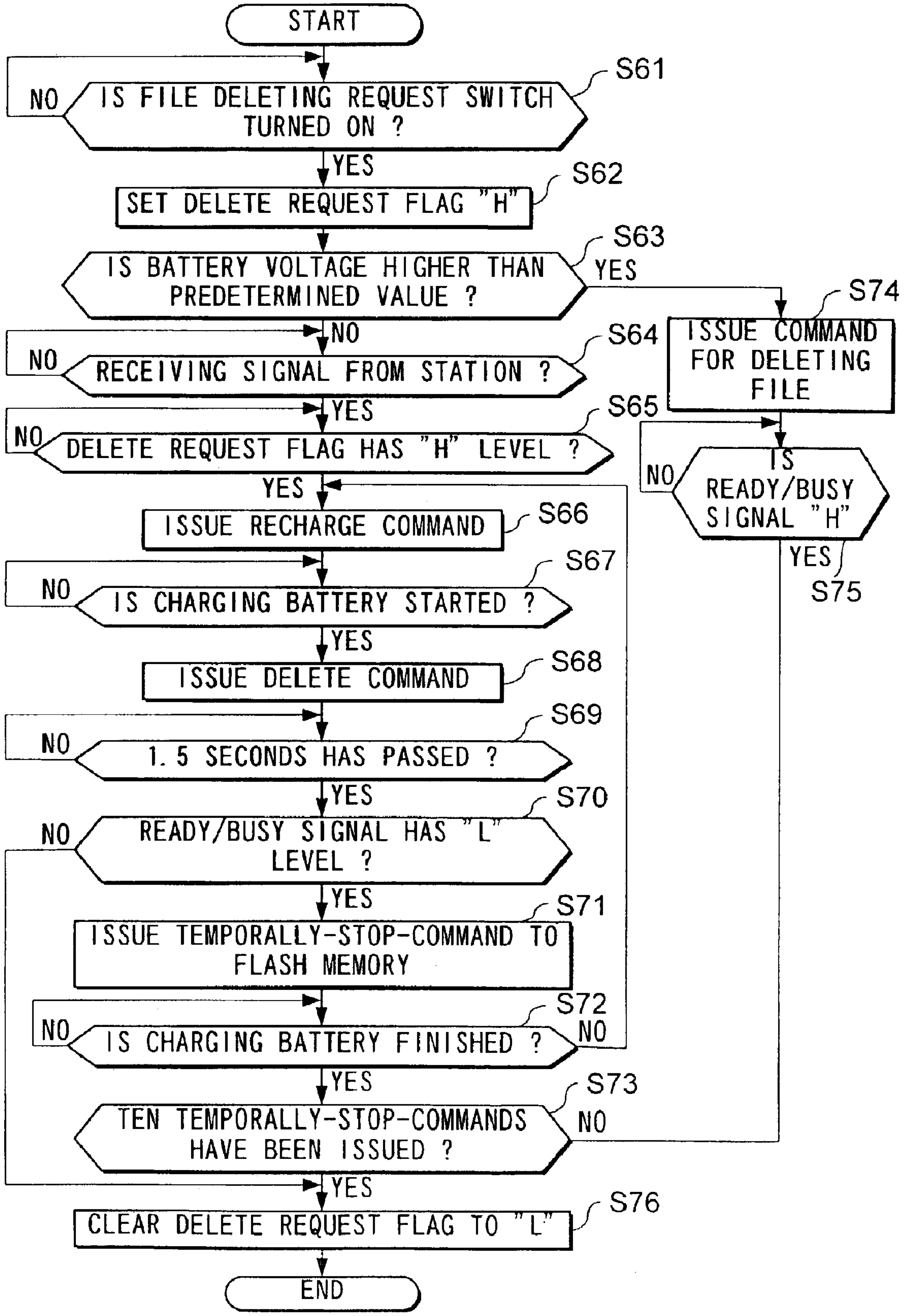
FIG. 11 is a flowchart illustrating an operation of the fourth embodiment.

FIG. 11 is a flow chart of the process during erasing data in the flash memory.

MPU 290 first makes a judgement if the file deleting request switch 275 is turned ON based on file deleting request signal Sdel (step S61).

When the result of judgment of step S61 is NO, MPU 290 remains waiting.

When the result of judgment at step S61 is YES, MPU 290 sets a delete request flag to the "H" (step S62).

Then MPU 290 makes a judgement if the voltage of the battery is higher than a predetermined battery voltage that is high enough to delete files in the flash memory (step S63).

When result of the judgment of step S63 is YES, MPU 290 issues a command for deleting files toward flash memory 280 (step S74).

Then MPU 290 examines state of flash memory 280 by using a ready/busy signal Sr/b. In more detail, MPU 290 examines if ready/busy signal is in the "H" level (step S75).

When ready/busy signal Sr/b has the "H" level, the flash memory is ready for deleting files. When ready/busy signal Sr/b has the "L" level, the flash memory is busy in deleting files.

When the judgement of step S75 is YES, flash memory 280 is in ready and the deleting files is finished. Therefore, MPU 290 clears the delete request flag to the "L" level and the process of this flowchart is finished (step S76).

When the judgement of step S75 is NO, MPU 290 waits for the end of deleting files in the flash memory because the flash memory is in the "H" level.

Also, when the judgement of step S63 is NO, MPU 290 makes a judgement if electronic timepiece 200 receives any signal from station 100 by using recharging and/or communication judgement signal Sc/c (step S64).

When the result of the judgement at step S64 is NO, MPU 290 remains waiting.

When the result of the judgement at step S64 is YES, MPU 290 accesses to RAM 270 to see if the delete request flag has the "H" level (step S65).

When the delete request flag has the "L" level (step S65 NO), MPU 290 remains waiting.

When the delete request flag has the "H" level (step S65 YES), MPU 290 measures a voltage of battery 220. Then, when MPU 290 makes a judgement that the charge in the rechargeable battery is not sufficient to delete files in flash memory 280, MPU 290 drives transistor 263 and issues a recharge command to station 100 by using coil 210 of electronic timepiece 200 (step S66).

Then MPU 290 makes a judgement if charging the battery is started by station 100 by using recharging and/or communication judgement signal Sc/c.

When the charging is not started (step S67 NO), MPU 290 remains waiting.

When the charging is started (step S67 YES), MPU 290 issues delete command to flash memory 280 (step S68).

In this case, the battery is charged intermittently with a duty factor of 50 (%). Also, the charging the battery lasts for a predetermined time period in order to display various messages such as error message. The duty factor may be changed according to the charged capacity of rechargeable battery 220. Also, when the charged capacity exceeds a predetermined value, it is possible to change from intermittent to continuous charging.

MPU 290 then makes a judgment if 1.5 seconds has passed after the issue of the delete command (step S69).

Until 1.5 seconds has passed, the judgment at step S69 is NO, so MPU 290 remains waiting. After 1.5 seconds has passed, the judgment at step S69 is YES, so MPU 290 makes a judgment if ready/busy signal Sr/b has the "L" level (step S70). When ready/busy signal Sr/b has the "L" level, flash memory 280 is in busy state.

When the judgment at step S70 is NO, MPU 290 ends the process since deleting files is finished.

When ready/busy signal Sr/b has the "L" level (step S70 YES), deleting files in the flash memory has not yet been finished. This might be because deleting files can not be done due to lack of battery power. Therefore, MPU 290 issues a temporally-stop-command to flash memory 280 (step S71) for waiting until charging is completed. Then MPU 290 makes a judgment if the charging battery is finished based on recharging and/or communication judgement signal Sc/c (step S72).

When the charging has not been finished at the judgment at step S72, MPU 290 waits until the charging is finished.

When the charging the battery is finished at the judgment at step S72, MPU 290 makes a judgment if ten temporally-stop-commands have been issued to flash memory 280 (step S73).

When judgment at step S73 is YES, there might be some trouble in rechargeable battery 220. Therefore, MPU 290 stops deleting files and sets the delete request flag to the "L" level (step S75) to perform notification to the user.

When less than 10 temporary-stop-commands have been issued and the judgment at step S73 is NO, MPU 290 returns the process to S66 and issues a charge command (step S66) again, and the same process is repeated.

[6] Modifications of the Fourth Embodiment

[6.1] First Modification

In the above explanation, the file deleting request switch 275 activates deleting files in the flash memory. However, when the data transmitted from the station 100 has a delete request command, MPU 290 may, after finishing the communication that includes the delete request command, issue the charge command to station 100 and then MPU 290 may delete or write data in flash memory 280 at the same time when recharging the battery is started.

[6.2] Second Modification

In the above, only deleting files in flash memory 280 is explained. However, the present invention can be applied to writing data in flash memory 280.

Also, when deleting, writing, and relocating data in flash memory 280, MPU 290 may first delete and write data in flash memory 280 and recharge the battery at the same time, then MPU 290 may arrange the used area and the unused area of flash memory.

[6.3] Third Modification

In the above explanation, after rechargeable battery 220 is fully charged, files in flash memory 280 are deleted using rechargeable battery 220. However, it is possible to directly use station 100 as power supply to delete files in flash memory 280.

[6.4] Fourth Modification

In the above explanation, the station 100 is used as battery charger and electronic timepiece 200 is used as a recharged device. However, the present invention may be applied to all the electronic apparatus with devices whose power consumption is relatively high like a flash memory. The present invention can also be applied to a battery charger and a rechargeable device with a rechargeable battery and a high load device such as a cordless phone, a mobile telephone, a personal handy phone, or a portable computer, a personal digital assistance (PDA). And the high load device may be a flash memory, an electroluminescence (EL) display, a vibrator motor, a buzzer, or an LED.

According to the fourth embodiment, a system with a high load device does not fail even when the high load device is driven due to the decline of the voltage incurred by the drive of the high load device.

[6.5] Fifth Modification

In the above description, as a rechargeable battery, lithium-ion rechargeable battery is used. However, the lithium-ion battery has some drawbacks, one such a drawback is dendrite. When voltage higher than limit voltage is applied to lithium-ion battery, dendrite crystal might be grown in the battery, and by this, paths of short circuit might be formed. These phenomenons shorten the life of the battery. Therefore, a prevention method for overcharging has been demanded. One method desired is when recharging rechargeable battery, charging is conducted in constant current until the voltage of the battery reaches the limit voltage, then charging is stopped. Therefore, the following recharging method may be used.

First, for the sake of understanding, the conventional prevention method of overcharging will be explained.

Figure 15:
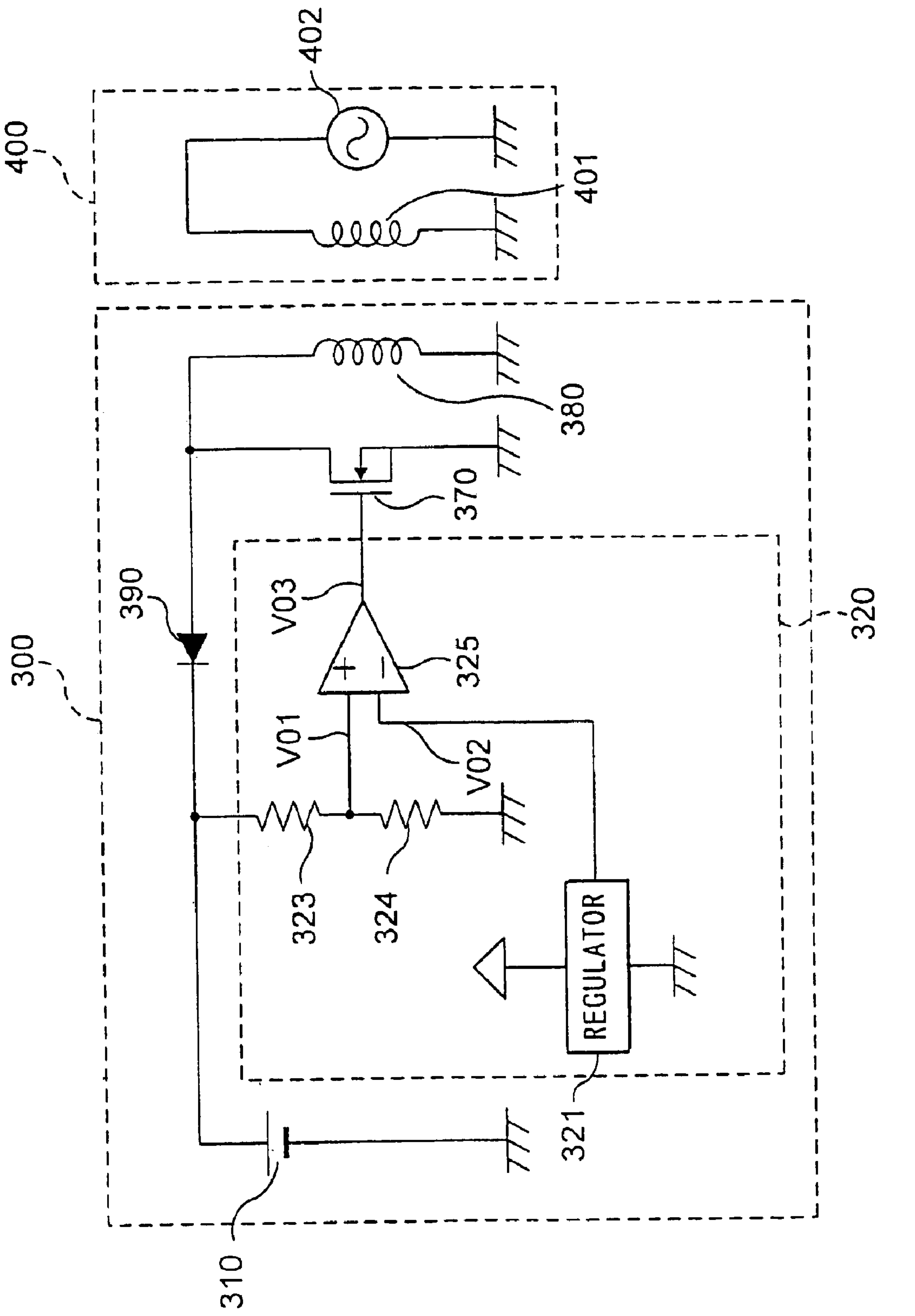
FIG. 15 (PRIOR ART)
FIG. 15 is a block diagram illustrating a conventional electronic timepiece and a conventional battery charger.

FIG. 15 is a block diagram that shows a conventional electronic timepiece and a conventional battery charger.

An electronic timepiece 300 is equipped with a rechargeable battery 310, a limiter controller circuit 320, a coil 380, a diode 390, and a transistor 370.

Rechargeable battery 310 functions as a power supply.

Limiter controller circuit 320 carries out controlling so that overcharging rechargeable battery 310 may not happen.

In coil 380, voltage is induced by magnetic field. Then the voltage is used to charge rechargeable battery 310.

Diode 390 rectifies the flow of the electrical current.

Transistor 370 functions as a switch to start and stop charging under control of limiter controller circuit 320.

Also, a charging device 400 is equipped with a coil 401 and a high-frequency power supply 402.

The coil is used as a primary coil, when coil 380 is used as a secondary coil.

The high-frequency power supply supplies an alternating voltage.

Limiter controller circuit 320 is equipped with a regulator 321, resistors 323 and 324, and a comparator 325.

Regulator 321 outputs a reference voltage V02 (for example, 2.5 volts).

Resistors 323 and 324 divide voltage of rechargeable battery 310 to generate a detection target voltage V01.

Comparator 325 compares reference voltage V02 with detection target voltage V01 and outputs the result.

With referring to FIG. 15, operation of charging is explained.

When starting charging battery, voltage of rechargeable battery 310 is low. Therefore, detection target voltage V01 is low and at this stage lower than reference voltage V02 output from regulator 321.

So, comparator 325 outputs a detection result signal V03 having the "L" level.

When the detection result signal has the "L" level, transistor 370 is in the OFF state. Therefore, electrical current does not flow from drain terminal T1 to source terminal T3. Consequently, charging rechargeable battery 310 continues.

When detection target voltage V01 exceeds reference voltage V02 after charging the battery, detection result voltage V03 output from comparator 325 is changed from the "L" level to the "H" level.

Then transistor 325 is turned ON. By this, both terminals of coil 380 are directly connected to the ground level, so the induced voltage in coil 380 does not charge rechargeable battery 310.

As described, when the voltage in rechargeable battery 310 reaches the limit voltage, charging rechargeable battery 310 is stopped.

However, there may be a drawback in the above charging method because there is an individual difference in characteristic of regulator and resistor. Namely, there may be a variation in resistance of resistors 323 and 324, so voltage V01 might have variation. Also, reference voltage V02 output from regulator 321 might have variation too. Further, characteristic of comparator 325 might have variation, so the point where the output level changes from the "L" to the "H" might have variation. Therefore, the point where transistor 370 is turned between ON to OFF might have variation.

As a result, limiter controller circuit 320 does not work properly, whereby overcharging might happen, which shortens the life of the battery.

Also, when limiter controller circuit 320 stops charging before voltage of the battery reaches the limit voltage, charging efficiency is impaired and usable time period of electronic timepiece 300 is shortened.

A: Configuration of the Fifth Modification

Next, the fifth modification will be described.

Figure 12:
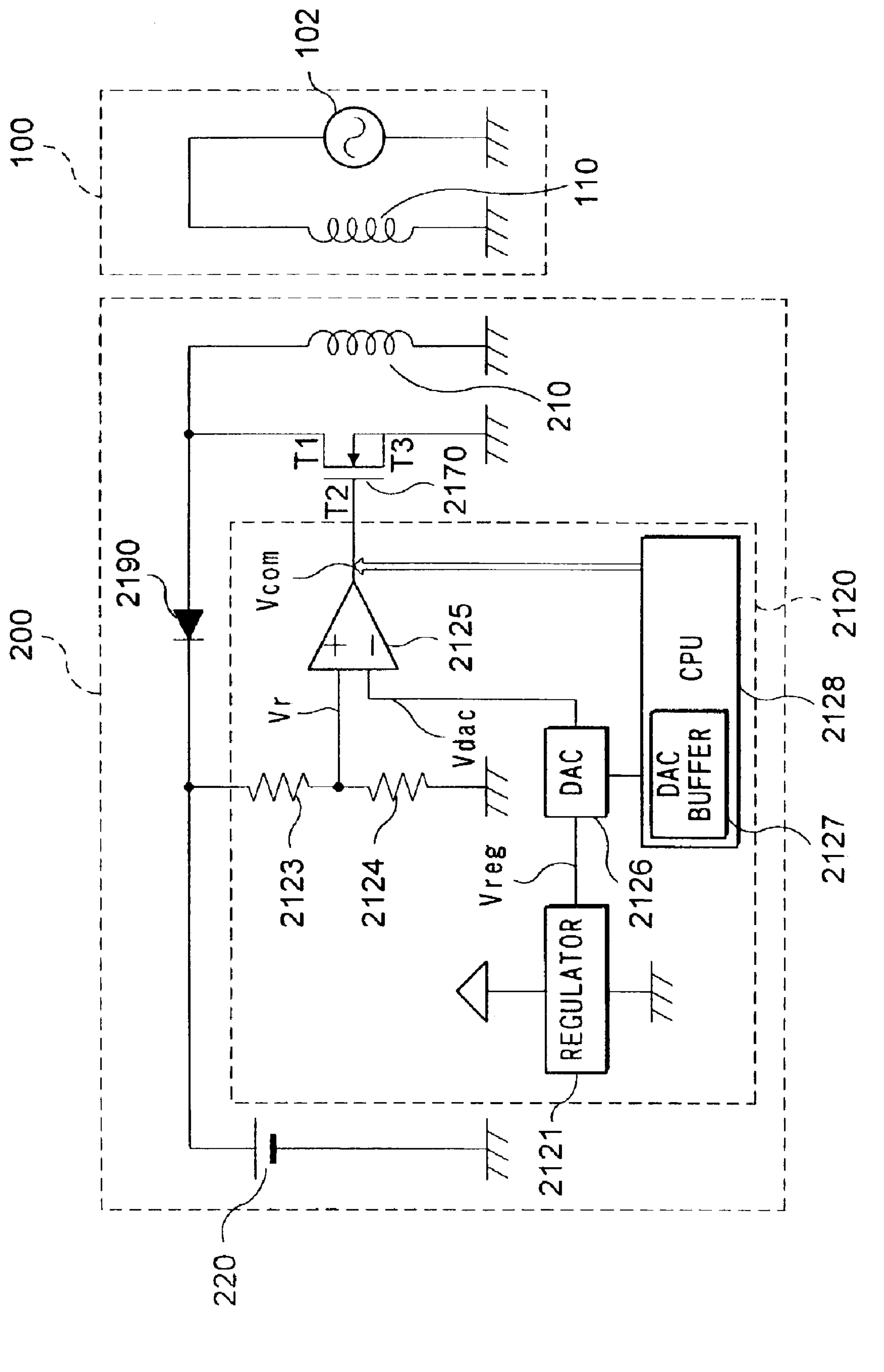
FIG. 12 is a block diagram illustrating an electronic timepiece and a battery charger of a fifth modification.

FIG. 12 is a diagram showing main units of an electronic timepiece with a rechargeable battery and a charger for the rechargeable battery.

Electronic timepiece 200 is equipped with a rechargeable battery 220, a limiter controller circuit 2120, a coil 210, a diode 2190, and a transistor 2170.

Rechargeable battery 220 supplies power.

Limiter controller circuit 2120 conducts control for preventing rechargeable battery 220 from being overcharged.

In coil 210, voltage is induced by electromagnetic induction.

Diode 2190 rectifies the electrical current.

Transistor 2170 functions as a switch to start and stop recharging the rechargeable battery under control of limiter controller circuit 2120.

Charger 100 has a coil 110 and a high-frequency power supply 102.

High-frequency power supply 102 feeds an alternating current to coil 110. This induces magnetic fields around coil 110.

High-frequency power supply 102 in this embodiment is a commercial power supply.

Limiter controller circuit 2120 has a regulator 2121, a digital/analog converter (DAC) 2126, resistors 2123 and 2124, and a comparator 2125.

Regulator 2121 outputs constant voltage Vreg (for example 2.5 Volts).

DAC 2126 outputs a reference voltage Vdac.

Resistors 2123 and 2124 divide the voltage of rechargeable battery 220 to output a detection target voltage Vr.

Comparator 2125 compares reference voltage Vdac with detection target voltage Vr to output a detection result voltage Vcom.

Limiter controller circuit 2120 also has a CPU 2128 that carries out controlling of limiter controller circuit 2120. CPU 2128 has a DAC buffer 2127 for storing value that is set in DAC 2126.

Regulator 2121 outputs constant voltage (for example 2.5 Volts) that is lower than the voltage (for example 3.94 Volts) supplied from rechargeable battery 220 to regulator 2121.

The regulator in this fifth modification outputs constant voltage of 2.5 Volts.

Comparator 2125 compares voltages supplied to the input terminals that are non-inverted input terminal and inverted input terminal, then outputs the comparison result. To illustrate, when voltage input to the non-inverted input terminal is higher than that of the inverted input terminal, comparator 2125 outputs detection result voltage Vcom having the "H" level. And when voltage input to the inverted input terminal is higher than that of the non-inverted input terminal, comparator 2125 outputs detection result voltage Vcom having "L" level.

Transistor 2170is an n-channel transistor, and its drain terminal T1 is connected to one terminal of the power supply, and its source terminal T3 is connected to the ground. Transistor 2170 is turned OFF state when its gate terminal T2 is connected to "L" level signal, and is turned ON state when its gate terminal T2 is connected to "H" signal.

When transistor 2170 is turned OFF, electrical current cannot flow from drain terminal T1 to source terminal T3. Therefore, there is no influence on charging rechargeable battery 220.

However, when transistor 2170 is turned ON, electronic current can flow from drain terminal T1 to source terminal T3. Therefore, coil 210 is directly connected to the ground level, thereby the induced voltage between the terminals of coil 210 does not charge the battery.

DAC 2126 also has a function of outputting voltage Vdac based on a set value in DAC 2126. To illustrate, the set value in DAC 2126 can be set from "00" to "FF". When "FF" is set, DAC 2126 outputs voltage as it receives. When "00" is set, DAC 2126 outputs voltage DAC 2126 can output: in this explanation, DAC 2126 outputs 0 volts. When the set value in DAC 2126 is somewhere in from "00" to "FF", DAC 2126 outputs voltage based on the set value.

B: Operation of the Fifth Modification

Before charging battery of electronic timepiece 200 of the fifth modification, one set value Dset of DAC 2126 is obtained, so that DAC 2126 can output reference voltage Vdac that is equal to the limit voltage of rechargeable battery 220.

Below, explanation is given of operation in obtaining set value Dset in DAC 2126 (initial adjustment), of operation in charging rechargeable battery 220 after set value Dset is obtained (recharging).

B1: Initial Adjustment

Before charging battery, obtaining set value Dset which is preset in DAC 2126 is a distinctive feature of the fifth modification. Determination of set value Dset is done for every electronic timepiece 200, and this determination is controlled by CPU 2128.

Figure 13:
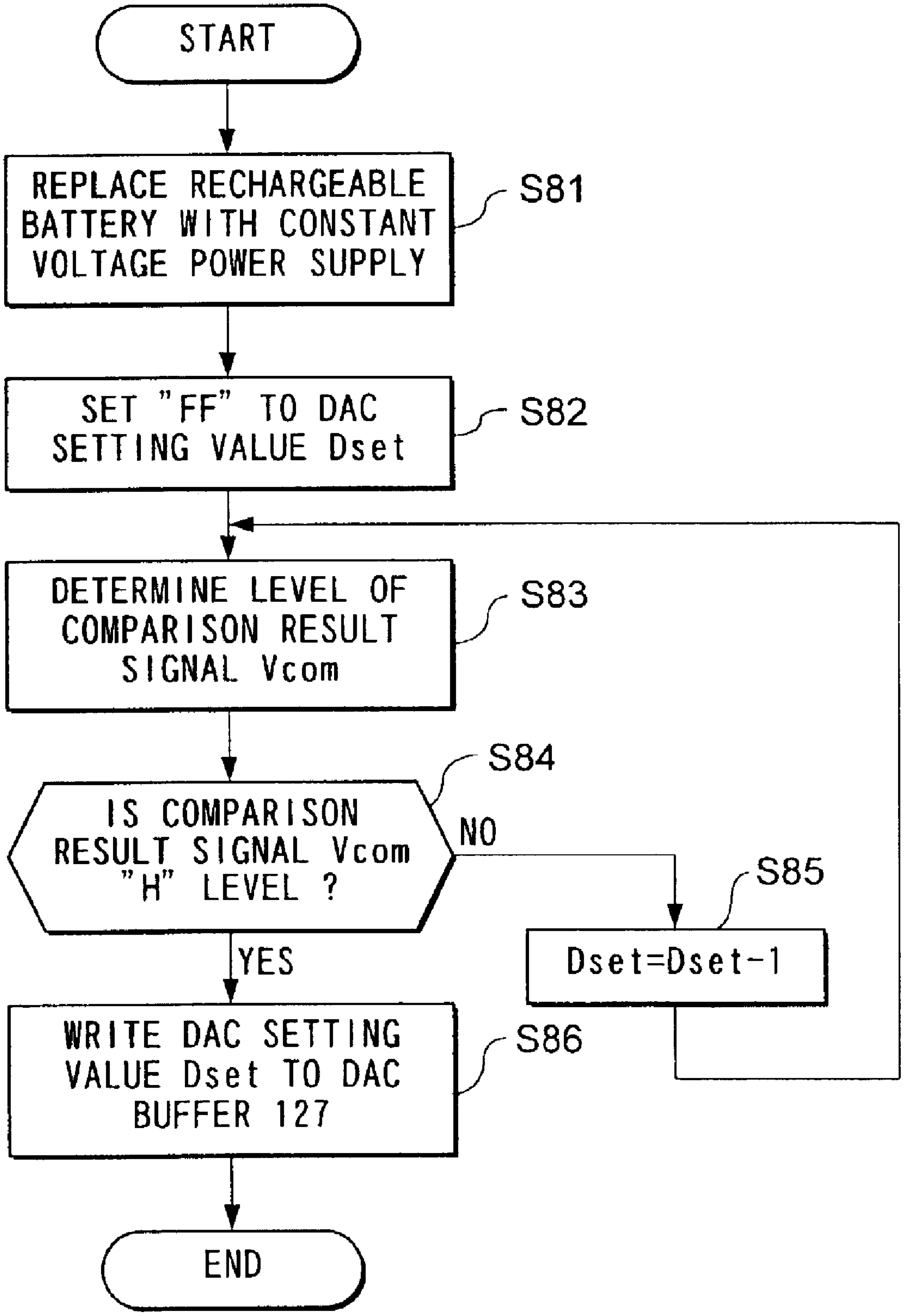
FIG. 13 is a flowchart illustrating an operation of the CPU of the battery charger of the fifth modification.

The flowchart in FIG. 13 is for operation of CPU 2128 in determining set value Dset for DAC 2126.

In FIG. 12, rechargeable battery 220 is replaced with a constant voltage power supply that outputs limit voltage Vlim (3.94 volts). Then regulator is supplied with the limit voltage Vlim and outputs constant voltage Vreg that is 2.5 volts in this explanation. Constant voltage Vreg is supplied to DAC 2126 (step S81).

On the other hand, resistors 2123 and 2124 divides the limit voltage Vlim having 3.94 volts to generate a reference voltage Vr. For example, when the limit voltage Vlim is halved, the reference voltage Vr has 1.97 volts. Then the reference voltage Vr is applied to the non-inverted input terminal of comparator 2125.

Since the reference voltage Vr is generated from constant voltage power supply, it has constant value and is used as reference voltage in determining set value Dset for DAC 2126.

Next, CPU 2128 sets "FF" as a provisional value to set value Dset (step S82). Then DAC 2126 outputs voltage Vreg (2.5 volts) as is received from regulator 2121 as voltage Vdac. Voltage Vdac is input to the inverted input terminal of comparator 2125.

Then level of comparison result signal Vcom output by comparator 2125 is determined under control of CPU 2128 (step S83). Since comparator 2125 receives the reference voltage Vr (1.97 volts) in the non-inverted input terminal and voltage Vdac (2.5 volts) in the inverted input terminal, so comparator 2125 outputs comparison result signal Vcom having "L" level.

When CPU 2128 determines that comparison result signal has the "L" level (step S84 NO), CPU 2128 subtracts 1 from set value Dset (step S85) to obtain "FE" in this case.

By this, voltage Vdac is slightly lowered. In this case, voltage Vdac becomes a bit lower than 2.5 volts.

Then again comparison result signal is checked (step S83). At this time, comparator receives the reference voltage Vr (1.97 volts) in the non-inverted input terminal and voltage Vdac (slightly below 2.5 volts) in the inverted input terminal, so comparator 2125 outputs comparison result signal Vcom still having "L" level.

Again when CPU 2128 determines that comparison result signal has the "L" level (step S84 NO), CPU 2128 subtracts 1 from set value Dset (step S85) to obtain "FD" in this case.

Similarly, as set value Dset decreases one by one, voltage Vdac decreases. Ultimately, voltage Vdac becomes equal to or lower than the reference voltage Vr (1.97 volts), then comparator 2125 outputs comparison result signal Vcom still having "H" level.

When CPU 2128 determines that comparison result signal is changed from the "L" level to the "H" level (step S84 YES), CPU 2128 reads set value Dset in DAC 2126 at that moment and then writes it to DAC buffer 2127 (step S86). Later, when charging rechargeable battery 220 of electronic timepiece 200, this set value Dset will be used as the set value for DAC 2126.

B2: Recharging

After acquiring DAC setting value Dset for DAC 2126 as described above, rechargeable battery 220 is charged. Operation for this charging will be described next.

First, outline of recharging operation will be described with referring to FIG. 12.

When high-frequency power supply 102 is turned ON, high-frequency signals are fed to coil 110 to generate magnetic field around coil 110. By this magnetic field, voltage is induced around coil 210 of electronic timepiece 200. Induced voltage around coil 210 causes electrical current. Diode 2190 rectifies this electrical current. Then rechargeable battery is charged by this current. When rechargeable battery 220 is charged until its limit voltage Vlim, transistor 2170 is turned ON under control of limiter controller circuit 2120. Therefore, charging battery is stopped.

Next, detail of recharging operation will be described.

Figure 14:
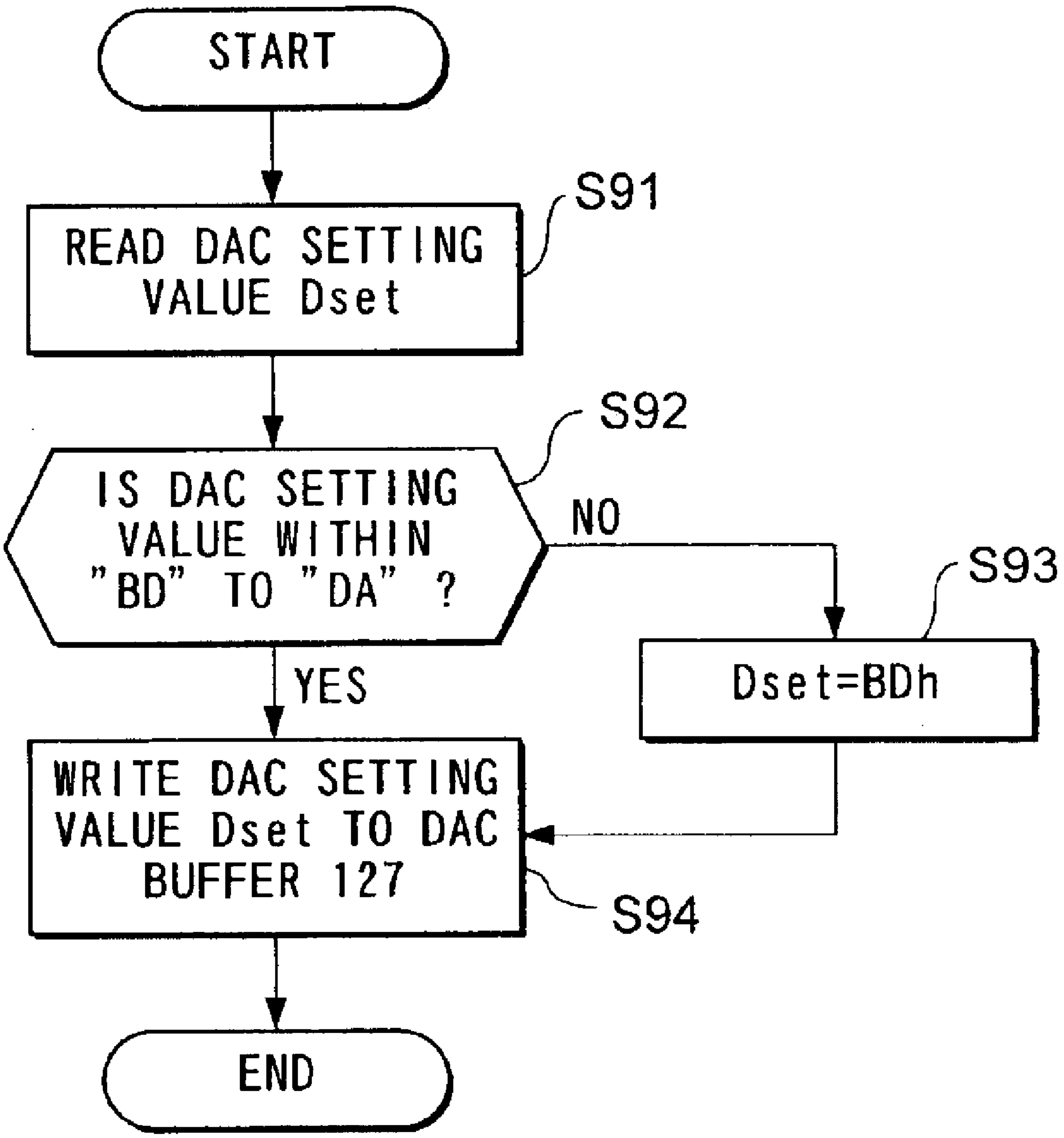
FIG. 14 is a flowchart illustrating an operation of the CPU of the battery charger of the fifth modification.

The program shown in FIG. 14 shows operation of CPU 2128 when starting to charge rechargeable battery 220.

CPU 2128 first reads set value Dset stored in DAC buffer 2127 and sets it to DAC 2126 (step S91).

Then set value Dset is determined whether it is in a prescribed range, in this explanation determination is made whether it is within the range from "BD" to "DA" (step S92). This range is pre-calculated by taking variation of electric characteristics of all the elements (such as resistor 123 etc.) of electronic timepiece 200 into consideration and is pre-stored in an unshown memory in CPU 2128

When set value Dset is not within a prescribed range (step S92 NO), then another value (in FIG. 14, BD that is lowest within BD to DA) that is in the prescribed range and safe enough for charging battery is rewritten in DAC 2126 (step S93) and also written in DAC buffer 2127 (step S94) as set value Dset.

Using a value that is in the prescribed range and safe enough for charging battery is to prevent overcharging.

Above is operation of CPU 2128 when starting to charge rechargeable battery 220.

Above operation is to prevent limiter controller circuit 2120 from being malfunctioning. For example, when inappropriate value such as "00" or "FF" is set in set value Dset for any reason and charging rechargeable battery 220 is conducted, limiter controller circuit 2120 does not function properly. Hence, charging battery after battery voltage reaches its limit voltage may happen, also charging battery may stop before battery voltage reaches its limit voltage.

In order to avoid such a situation, range of set value Dset is predetermined and CPU 2128 controls to prevent set value Dset from being set out of the predetermined range. Therefore, even when inappropriate value such as "00" or "FF" is set as set value Dset, CPU 2128 can rewrite set value Dset (in this case, to "BD") that is safe enough not to overcharge battery in theory.

Hence, life of rechargeable battery 220 may not be shortened by inappropriate value settings.

Next, explanation of charging battery conducted after set value Dset is set in DAC 2126 as described.

When charging is started, voltage of rechargeable battery 220 is low, so the reference voltage Vr is also low and lower than voltage Vdac output from DAC 2126.

Therefore, comparator 2125 outputs comparison result signal Vcom having "L" level.

When comparator 2125 outputs "L" level signal, transistor 2170 is in OFF state. Therefore, electrical current does not flow from drain terminal T1 to source terminal T3. Consequently, charging battery continues.

When the reference voltage Vr exceeds voltage Vdac after charging the battery, comparison result signal Vcom output from comparator 325 is changed from the "L" level to the "H" level.

Then transistor 2170 is turned ON. By this, both terminals of coil 210 are connected directly to the ground level, so the induced voltage in coil 2170 does not charge rechargeable battery 220.

As described, when voltage in rechargeable battery 220 reaches limit voltage Vlim, charging rechargeable battery 220 is stopped.

C: Modifications of the Fifth Modification (1) First Modification

Determination of set value Dset may be carried out by a personal computer (PC) that is connected to electronic timepiece 200 as external controller and by controlling General Purpose Interface Bus (GPIB).

For example, comparison result signal Vcom output from comparator 2125 is sent to a PC via GPIB by using a dedicated software. Then a CPU in the PC sees the level of comparison result signal Vcom and conducts a program that follows the flowchart shown in FIG. 13 to obtain set value for DAC 2126 and write it to DAC buffer 2127.

In this case, electronic timepiece 200 does not have to have program for obtaining set value Dset for DAC 2126.

(2) Second Modification

In the above explanation, a regulator is used for a unit that outputs constant voltage. However, other circuit may be used such as the one with diode or operational amplifier that outputs constant voltage.

(3) Third Modification

In the above explanation, the eight-bit DAC 2126 is used and value with eight bits is set in DAC 2126. However, using a DAC with more resolution and thus using more number of bits would enable more precise charging than in the above explanation.

(4) Fourth Modification

The transistor used to control starting and stopping charging the battery may be changed to other switching element. When a switching element can be switched ON and OFF by detection result voltage Vcom, the switching element may be used in the present invention.

(5) Fifth Modification

When a rechargeable battery is recharged many times, its internal resistance is changed. By taking this characteristic into consideration, it is possible to enable user to voluntarily set set value Dset in DAC 2126. Or it is also possible to configure the system to automatically rewrite set value Dset by measuring internal resistance of rechargeable battery.

What is claimed is:

1. An electronic apparatus comprising:

a power supply that supplies power;

a driven unit that is driven by the power from the power supply;

a dummy load that discharges the power supply;

a switch that connects or disconnects the dummy load to or from the power supply;

a storage unit that stores a group of first voltage values and second voltage values, each of the first voltage values being associated with a respective one of the second voltage values, the first voltage values being voltage values of the power supply when no load, including the dummy load, is connected to the power supply, the second voltage values being voltage values of the power supply when no load other than the dummy load is connected to the power supply and an internal resistance of the power supply is at a highest allowable value, the highest allowable value of the internal resistance being the highest internal resistance of the power supply that can drive the driven unit when no load other than the dummy load is connected to the power supply;

a voltage measurement unit that measures voltage of the power supply;

a comparison unit that compares a third voltage value and a fourth voltage value, the third voltage value, measured by the voltage measurement unit, when the dummy load is connected to the power supply and when the driven unit is also connected to the power supply, the fourth voltage value being an extracted one of the second voltage values stored in the storage unit, the extracted one of the second voltage values corresponding to one of the first voltage values that is equal to a fifth voltage value which is measured by the voltage measurement unit when the dummy load is not connected to the power supply and when the driven unit is connected to the power supply; and a determination unit that determines whether the driven unit can be driven based on the comparison result, and, when it is possible to drive the driven unit, drives the driven unit.

2. An electronic apparatus of claim 1:

wherein the determination unit makes a determination to drive the driven unit when the third voltage value is higher than the fourth voltage value.

3. An electronic apparatus of claim 1:

wherein a resistance value of the dummy load is smaller than a resistance of the driven unit and is higher than a predetermined value.

4. An electronic apparatus of claim 3:

wherein the predetermined value is more than one tenth of the resistance of the driven unit.

5. An electronic apparatus of claim 1:

wherein the voltage measurement unit measures the third voltage value when a change rate of voltage of the power supply per unit time falls within a predetermined range after the dummy load is connected to the power supply.

6. An electronic apparatus of claim 5:

wherein the predetermined range is within 5 (mV/msec).

7. An electronic apparatus of claim 5:

wherein the predetermined range is within 0.5 (mV/msec).

8. An electronic apparatus of claim 1:

wherein the voltage measurement unit measures the fifth voltage value when a change rate of voltage of the power supply per unit time falls within a predetermined range after driving of the driven unit stops.

9. An electronic apparatus of claim 8:

wherein the voltage measurement unit uses a last-measured voltage when the change rate of voltage of the power supply does not fall within the predetermined range within a predetermined time period.

10. An electronic apparatus of claim 8:

wherein the predetermined range is within 5 (mV/msec).

11. An electronic apparatus of claim 8:

wherein the predetermined range is within 0.5 (mV/msec).

12. An electronic apparatus of claim 1:

wherein the storage unit, conducts a stepwise increase of voltage V0 and substitutes voltage V0 into equations (1) and (2) to obtain voltage VTL;

associates voltage V0 with an address in the storage unit; and stores voltage VTL as data for the address associated with voltage V0;

$$RL=RX\cdot(V0-V4)/V4 \quad (1)$$

$$VTL=RT\cdot(V0/(RL+RT)) \quad (2)$$

where,

RL denotes highest allowable internal resistance of the power supply to drive the driven unit when no load is connected to the power supply, RX denotes a converted value of resistance of the driven unit,

V0 denotes the first voltage value,

V4 denotes the lowest allowable voltage value of the power supply to drive the driven unit, VTL denotes the fourth voltage values, and RT denotes the resistance value of the dummy load.

13. An electronic apparatus of claim 12, further comprising:

a plurality of driven units;

wherein, when the plurality of driven units are driven at the same time, and converted value RX of resistance of the driven units is combined converted resistance of all driven units.

14. An electronic apparatus of claim 12:

wherein the storage unit sets the first voltage values V0 as a lower order bit of the address, sets a drive request of driven units as a higher order bit of the address, and stores the second voltage values VTL as data of the address specified by the lower order bit and the higher order bit.

15. An electronic apparatus of claim 1, further comprising a voltage regulator that outputs constant voltage;

wherein, the driven unit is supplied with the power via the voltage regulator, and the storage unit, conducts a stepwise increase of voltage V0 and substitutes voltage V0 into equations (1) and (2) to obtain voltage VTL;

associates voltage V0 with an address in the storage unit; and stores voltage VTL as data for the address associated with voltage V0;

$$RL=RX\cdot(V0-V4)/V4-REGd \quad (1)$$

$$VTL=RT\cdot(V0/(RL+RT)) \quad (2)$$

where,

RL denotes the highest allowable internal resistance of the power supply to drive the driven unit when no load is connected to the power supply, RX denotes a converted value of resistance of the driven unit,

V0 denotes the first voltage value,

V1 denotes the second voltage value,

V4 denotes the lowest allowable voltage value of the power supply to drive the driven unit, REGd a resistance value converted from voltage drop of the voltage regulator, VTL denotes the fourth voltage value, and RT denotes the resistance value of the dummy load.

16. An electronic apparatus of claim 1, further comprising a voltage regulator that outputs constant voltage;

wherein, the driven unit is supplied with the power via the voltage regulator and is able to operate with a voltage lower than the constant voltage; and the storage unit, conducts a stepwise increase of voltage V0 and substitutes voltage V0 into equations (1) and (2) to obtain voltage VTL;

associates voltage V0 with an address in the storage unit; and stores voltage VTL as data for the address associated with voltage V0;

$$RL=RX\cdot(V0-V4)/V4-REGd-REGdd\cdot(REGout-V4) \quad (1)$$

$$VTL=RT\cdot(V0/(RL+RT)) \quad (2)$$

where,

RL denotes the highest allowable internal resistance of the power supply to drive the driven unit when no load is connected to the power supply, RX denotes a converted value of resistance of the driven unit,

V0 denotes the first voltage value,

V1 denotes the second voltage value,

V4 denotes the lowest allowable voltage value of the power supply to drive the driven unit, REGd denotes a resistance value converted from voltage drop of the voltage regulator, REGout denotes a rated output voltage of the voltage regulator, REGdd denotes a conversion factor for resistance for voltage drop of the voltage regulator in a case where voltage of the power supply is lower than the rated output voltage REGout of the voltage regulator, VTL denotes the fourth voltage value, and RT denotes the resistance value of the dummy load.

17. An electronic apparatus of claim 1, further comprising a voltage regulator that outputs constant voltage;

wherein, the driven unit comprises a first driven unit that is supplied with the power from the power supply and a second driven unit that is supplied with the power via the voltage regulator, the first and the second driven units being driven at the same time; and the storage unit, conducts a stepwise increase of voltage V0 and substitutes voltage V0 into equations (1), (2), and (3) to obtain voltage VTL;

associates voltage V0 with an address in the storage unit; and stores voltage VTL as data for the address associated with voltage V0;

$$RL1=(V0-V4)/((V4/Rmo)+(V4/(Reb+REGd))) \quad (1)$$

$$RL2=(V0-(V4+(V4\cdot REGd/Reb)))/((V4/Reb)+(((V4\cdot REGd/Reb)+V4)/Rmo)) \quad (2)$$

$$VTL=RT\cdot(V0/(RL+RT)) \quad (3)$$

where,

RL1 denotes a highest allowable internal resistance of the power supply to drive the first driven unit, RL2 denotes a highest allowable internal resistance of the power supply to drive the second driven unit, RL denotes a highest allowable internal resistance of the power supply to drive the driven unit when no load is connected to the power supply, and is equal to RL1 when RL1 is smaller than RL2 or equal to RL2 when RL2 is smaller than RL1,

V0 denotes the first voltage value,

V1 denotes the second voltage value,

V4 the lowest allowable voltage value of the power supply to drive the driven unit, Rmo denotes a converted resistance value of the first driven unit, Reb denotes a converted resistance value of the second driven unit, REGd a resistance value converted from voltage drop of the voltage regulator, VTL denotes the fourth voltage value, and RT denotes the resistance value of the dummy load.

18. An electronic apparatus of claim 1, further comprising a voltage regulator that outputs constant voltage REGout; wherein, the driven unit comprises a first driven unit that is supplied with the power from the power supply and a second driven unit that is supplied with the power via the voltage regulator and is able to operate with voltage lower than the constant voltage REGout, the first and the second driven units being driven at the same time; and the storage unit, conducts a stepwise increase of voltage V0 and substitutes voltage V0 into equations (1), (2), and (3) to obtain voltage VTL;

associates voltage V0 with an address in the storage unit; and stores voltage VTL as data for the address associated with voltage V0;

$$RL1=(V0-V4)/((V4/Rmo)+V4/(Reb+REGd+(REGdd\cdot(REGout-V4)))) \quad (1)$$

$$RL2=(V0-(V4+(V4\cdot(REGd+REGdd\cdot(REGout-V4))/Reb))))/((V4/Reb)+(((V4\cdot(REGd+REGdd\cdot(REGout-V4))/Reb))+V4/Rmo)) \quad (2)$$

$$VTL=RT\cdot(V0/(RL+RT)) \quad (3)$$

where,

RL1 denotes a highest allowable internal resistance of the power supply to drive the first driven unit, RL2 denotes a highest allowable internal resistance of the power supply to drive the second driven unit, RL denotes a highest allowable internal resistance of the power supply to drive the driven unit when no load is connected to the power supply, and is equal to RL1 when RL1 is smaller than RL2 or equal to RL2 when RL2 is smaller than RL1, V0 denotes the first voltage value, V1 denotes the second voltage value, V4 denotes the lowest allowable voltage value of the power supply to drive the driven unit, Rmo denotes a converted resistance value of the first driven unit, Reb denotes a converted resistance value of the second driven unit, REGd denotes a resistance value converted from voltage drop of the voltage regulator, REGdd denotes a conversion factor for resistance for voltage drop of the voltage regulator in a case where voltage of the power supply is lower than constant voltage REGout, VTL denotes the fourth voltage value, and RT denotes the resistance value of the dummy load.

19. A control method of an electronic apparatus:

the electronic apparatus comprising;

a power supply that supplies power;

a driven unit that is driven by the power from the power supply;

a dummy load that discharge the power supply;

a switch that connects or disconnects the dummy load to or from the power supply; and a storage unit that stores a group of first voltage values and second voltage values, each of the first voltage values being associated with a respective one of the second voltage values[1], the first voltage values being voltage values of the power supply when no load, including the dummy load, is connected to the power supply, the second voltage values being voltage values of the power supply when no load other than the dummy load is connected to the power supply and an internal resistance of the power supply is at a highest allowable value, the highest allowable value of the internal resistance being the highest internal resistance of the power supply that can drive the driven unit when no load other than the dummy load is connected to the power supply;

a voltage measurement unit that measures voltage of the power supply;

the control method comprising the steps of:

comparing a third voltage value and a fourth voltage value, the third voltage value, measured by the voltage measurement unit when the dummy load is connected to the power supply and when the driven unit is also connected to the power supply, the fourth voltage value being an extracted one of the second voltage values stored in the storage unit, the extracted one of the second voltage values corresponding to one of the first voltage values that is equal to a fifth voltage value which is measured by the voltage measurement unit when the dummy load is not connected to the power supply and when the driven unit is connected to the power supply;

determining whether the driven unit can be driven based on the comparison result; and driving the driven unit when it is determined that driving the driven unit is possible.

20. A control method of an electronic apparatus of claim 19:

wherein the voltage measurement unit measures the third voltage value when a change rate of voltage of the power supply per unit time falls within a predetermined range after the dummy load is connected to the power supply.

21. A control method of an electronic apparatus of claim 20:

wherein the predetermined range is within 5 (mV/msec).

22. A control method of an electronic apparatus of claim 20:

wherein the predetermined range is within 0.5 (mV/msec).

23. A control method of an electronic apparatus of claim 20:

wherein the predetermined range is within 5 (mV/msec).

24. A control method of an electronic apparatus of claim 20:

wherein the predetermined range is within 0.5 (mV/msec).

25. A control method of an electronic apparatus of claim 19:

wherein the voltage measurement unit measures the third voltage value when a change rate of voltage of the power supply per unit time falls within a predetermined value after driving of the driven unit stops.

26. A control method of an electronic apparatus of claim 25:

wherein the voltage measurement unit uses a last-measured voltage when the change rate of voltage of the power supply does not fall within the predetermined range within a predetermined time period.

27. A control method of an electronic apparatus of claim 19:

the control method comprising:

conducting a stepwise increase of voltage V0 and substituting voltage V0 into equations (1) and (2) to obtain voltage VTL;

associating voltage V0 with an address in the storage unit; and storing voltage VTL as data for the address associated with voltage V0;

$$RL=RX\cdot(V0-V4)/V4 \quad (1)$$

$$VTL=RT\cdot(V0/(RL+RT)) \quad (2)$$

where,

RL denotes the highest allowable internal resistance of the power supply to drive the driven unit when no load is connected to the power supply, RX denotes a converted value of resistance of the driven unit, V0 denotes the first voltage value, V4 denotes the lowest allowable voltage value of the power supply to drive the driven unit, VTL denotes the fourth voltage value, and RT denotes the resistance value of the dummy load.

28. A control method of an electronic apparatus of claim 27:

wherein, when a plurality of driven units are driven at the same time, converted value RX of resistance of the driven units is combined converted resistance of all driven units.

29. A control method of an electronic apparatus of claim 27:

wherein, voltage V0 of the power supply with no load being imposed is set as a lower order bit of the address, a drive request of driven units is set as a higher order bit of the address, and voltage VTL is set as data of the address specified by the lower order bit and the higher order bit.

30. A control method of an electronic apparatus of claim 19:

the electronic apparatus further comprising a voltage regulator that outputs constant voltage;

wherein, the driven unit is supplied with the power via the voltage regulator, and the control method further comprising:

conducting a stepwise increase of voltage V0 and substituting voltage V0 into equations (1) and (2) to obtain voltage VTL;

associating voltage V0 with an address in the storage unit; and storing voltage VTL as data for the address associated with voltage V0;

$$RL=RX\cdot(V0-V4)/V4-REGd \quad (1)$$

$$VTL=RT\cdot(V0/(RL+RT)) \quad (2)$$

where,

RL denotes the highest allowable internal resistance of the power supply to drive the driven unit when no load is connected to the power supply, RX denotes a converted value of resistance of the driven unit, V0 denotes the first voltage value, V1 denotes the second voltage value, V4 denotes the lowest allowable voltage value of the power supply to drive the driven unit, REGd denotes a resistance value converted from voltage drop of the voltage regulator, VTL denotes the fourth voltage value, and RT denotes the resistance value of the dummy load.

31. A control method of an electronic apparatus of claim 19:

the electronic apparatus further comprising a voltage regulator that outputs constant voltage;

wherein, the driven unit is supplied with the power via the voltage regulator and is able to operate with a voltage lower than the constant voltage; and the control method further comprising:

conducting a stepwise increase of voltage V0 and substituting voltage V0 into equations (1) and (2) to obtain voltage VTL;

associating voltage V0 with an address in the storage unit; and storing voltage VTL as data for the address associated with voltage V0;

$$RL=RX\cdot(V0-V4)/V4-REGd-REGdd\cdot(REGout-V4) \quad (1)$$

$$VTL=RT\cdot(V0/(RL+RT)) \quad (2)$$

where,

RL denotes the highest allowable internal resistance of the power supply to drive the driven unit when no load is connected to the power supply, RX denotes a converted value of resistance of the driven unit, V0 denotes the first voltage value, V1 denotes the second voltage value, V4 denotes the lowest allowable voltage value of the power supply to drive the driven unit, REGd denotes a resistance value converted from voltage drop of the voltage regulator, REGout denotes a rated output voltage of the voltage regulator, REGdd denotes a conversion factor for resistance for voltage drop of the voltage regulator in a case where voltage of the power supply is lower than rated output voltage REGout of the voltage regulator, VTL denotes the fourth voltage value, and RT denotes the resistance value of the dummy load.

32. A control method of an electronic apparatus of claim 19, the electronic apparatus further comprising a voltage regulator that outputs constant voltage;

wherein, the driven unit comprises a first driven unit that is supplied with the power from the power supply and a second driven unit that is supplied with the power via the voltage regulator, the first and the second driven units being driven at the same time; and the control method further comprising:

conducting a stepwise increase of voltage V0 and substituting voltage V0 into equations (1), (2), and (3) to obtain voltage VTL;

associating voltage V0 with an address in the storage unit; and storing voltage VTL as data for the address associated with voltage V0;

$$RL1=(V0-V4)/((V4/Rmo)+(V4/(Reb+REGd))) \quad (1)$$

$$RL2=(V0-(V4+(V4\cdot REGd/Reb)))/((V4/Reb)+(((V4\cdot REGd/Reb)+V4)/Rmo)) \quad (2)$$

$$VTL=RT\cdot(V0/(RL+RT)) \quad (3)$$

where,

RL1 denotes a highest allowable internal resistance of the power supply to drive the first driven unit, RL2 denotes a highest allowable internal resistance of the power supply to drive the second driven unit, RL denotes a highest allowable internal resistance of the power supply to drive the driven unit when no load is connected to the power supply, and is equal to RL1 when RL1 is smaller than RL2 or to RL2 when RL2 is smaller than RL1,

V0 denotes the first voltage value,

V1 denotes the second voltage value,

V4 denotes the lowest allowable voltage value of the power supply to drive the driven unit, Rmo denotes a converted resistance of the first driven unit, Reb denotes a converted resistance of the second driven unit, REGd denotes a resistance value converted from voltage drop of the voltage regulator, VTL denotes the fourth voltage value, RT denotes the resistance value of the dummy load.

33. A control method of an electronic apparatus of claim 19, the electronic apparatus further comprising a voltage regulator that outputs constant voltage REGout;

wherein, the driven unit comprises a first driven unit that is supplied with the power from the power supply and a second driven unit that is supplied with the power via the voltage regulator and is able to operate with voltage lower than the constant voltage REGout, the first and the second driven units being driven at the same time; and the control method further comprising:

conducting a stepwise increase of voltage V0 and substituting voltage V0 into equations (1), (2), and (3) to obtain voltage VTL;

associating voltage V0 with an address in the storage unit; and storing voltage VTL as data for the address associated with voltage V0;

$$RL1=(V0-V4)/((V4/Rmo)+V4/(Reb+REGd+(REGdd\cdot(REGout-V4)))) \quad (1)$$

$$RL2=(V0-(V4+(V4\cdot(REGd+REGdd\cdot(REGout-V4))/Reb))))/((V4/Reb)+(((V4\cdot(REGd+REGdd\cdot(REGout-V4))/Reb))+V4/Rmo)) \quad (2)$$

$$VTL=RT\cdot(V0/(RL+RT)) \quad (3)$$

where,

RL1 denotes a highest allowable internal resistance of the power supply to drive the first driven unit, RL2 denotes a highest allowable internal resistance of the power supply to drive the second driven unit, RL denotes a highest allowable internal resistance of the power supply to drive the driven unit when no load is connected to the power supply, and is equal to RL1 when RL1 is smaller than RL2 or equal to RL2 when RL2 is smaller than RL1,

V0 denotes the first voltage value,

V1 denotes the second voltage value,

V4 denotes the lowest allowable voltage value of the power supply to drive the driven unit, Rmo denotes a converted resistance value of the first driven unit, Reb denotes a converted resistance value of the second driven unit, REGd denotes a resistance value converted from voltage drop of the voltage regulator, REGdd denotes a conversion factor for resistance for voltage drop of the voltage regulator in a case where a voltage of the power supply is lower than constant voltage REGout, VTL denotes the fourth voltage value, and RT denotes the resistance value of the dummy load.

* * * * *